United States Patent
Eguchi et al.

(10) Patent No.: US 7,185,227 B2
(45) Date of Patent: Feb. 27, 2007

(54) DATA RESTORING METHOD AND AN APPARATUS USING JOURNAL DATA AND AN IDENTIFICATION INFORMATION

(75) Inventors: Yoshiaki Eguchi, Machida (JP); Kazuhiko Mogi, Yokohama (JP); Yasutomo Yamamoto, Sagamihara (JP); Takashi Oeda, Sagamihara (JP); Kouji Arai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 421 days.

(21) Appl. No.: 10/428,204

(22) Filed: Apr. 30, 2003

(65) Prior Publication Data

US 2004/0193945 A1 Sep. 30, 2004

(30) Foreign Application Priority Data

Feb. 20, 2003 (JP) ............................. 2003-041986

(51) Int. Cl.
*G06F 11/00* (2006.01)

(52) U.S. Cl. ...................... 714/15; 714/6; 711/162; 707/202; 707/204

(58) Field of Classification Search ............. None
See application file for complete search history.

(56) References Cited

U.S. PATENT DOCUMENTS

| | | | |
|---|---|---|---|
| 5,065,311 A | 11/1991 | Masai et al. | |
| 5,263,154 A | 11/1993 | Eastridge et al. | |
| 5,369,757 A | 11/1994 | Spiro et al. | |
| 5,404,508 A | 4/1995 | Konrad et al. | |
| 5,555,371 A | 9/1996 | Duyanovich et al. | |
| 5,644,696 A | 7/1997 | Pearson et al. | |
| 5,664,186 A | 9/1997 | Bennett et al. | |
| 5,701,480 A | 12/1997 | Raz | |
| 5,720,029 A | * 2/1998 | Kern et al. | .................... 714/20 |
| 5,724,581 A | * 3/1998 | Kozakura | ................... 707/202 |
| 5,751,997 A | 5/1998 | Kullick et al. | |
| 5,835,953 A | 11/1998 | Ohran | |
| 5,867,668 A | 2/1999 | Spirakis et al. | |
| 5,870,758 A | 2/1999 | Bamford et al. | |
| 5,987,575 A | 11/1999 | Yamaguchi | |

(Continued)

FOREIGN PATENT DOCUMENTS

JP 2001-216185 8/2001

(Continued)

OTHER PUBLICATIONS

"Making ROI a Snap: Leveraging the Power of Snapshot Technology with ComVault™, QiNetix™, Quick Recovery", CommVault Systems, 2002, pp. 1-4.

(Continued)

*Primary Examiner*—Robert Beausoliel
*Assistant Examiner*—Philip Guyton
(74) *Attorney, Agent, or Firm*—Mattingly, Stanger, Malur & Brundidge, P.C.

(57) ABSTRACT

A host and a storage system each keep a shared identifier indicating a state of a system. The storage system acquires, at update of data, a data pair including data for a change through processing of the host and data before the update. The storage system relates the data pair to a shared identifier. When the host indicates an identifier, the storage system restores data using the data pair.

28 Claims, 21 Drawing Sheets

U.S. PATENT DOCUMENTS

| | | | |
|---|---|---|---|
| 6,065,018 A * | 5/2000 | Beier et al. | 707/202 |
| 6,081,875 A | 6/2000 | Clifton et al. | |
| 6,154,852 A | 11/2000 | Amundson et al. | |
| 6,269,381 B1 | 7/2001 | St. Pierre et al. | |
| 6,269,431 B1 | 7/2001 | Dunham | |
| 6,298,345 B1 | 10/2001 | Armstrong, Jr. et al. | |
| 6,301,677 B1 | 10/2001 | Squibb | |
| 6,353,878 B1 | 3/2002 | Dunham | |
| 6,397,351 B1 * | 5/2002 | Miller et al. | 714/13 |
| 6,460,055 B1 * | 10/2002 | Midgley et al. | 707/204 |
| 6,463,501 B1 * | 10/2002 | Kern et al. | 711/100 |
| 6,539,462 B1 | 3/2003 | Mikkelsen et al. | |
| 6,587,970 B1 | 7/2003 | Wang et al. | |
| 6,594,781 B1 | 7/2003 | Komasaka et al. | |
| 6,658,434 B1 | 12/2003 | Watanabe et al. | |
| 6,665,815 B1 | 12/2003 | Goldstein et al. | |
| 6,691,245 B1 | 2/2004 | DeKoning | |
| 6,711,409 B1 | 3/2004 | Zavgren, Jr. et al. | |
| 6,728,747 B1 | 4/2004 | Jenkins et al. | |
| 6,732,123 B1 * | 5/2004 | Moore et al. | 707/202 |
| 6,732,124 B1 * | 5/2004 | Koseki et al. | 707/202 |
| 6,732,125 B1 | 5/2004 | Autrey et al. | |
| 6,742,138 B1 * | 5/2004 | Gagne et al. | 714/6 |
| 6,839,819 B2 | 1/2005 | Martin | |
| 6,842,825 B2 * | 1/2005 | Geiner et al. | 711/133 |
| 6,883,112 B2 * | 4/2005 | Maeda et al. | 714/6 |
| 6,898,688 B2 | 5/2005 | Martin et al. | |
| 6,915,315 B2 | 7/2005 | Autrey et al. | |
| 6,978,282 B1 | 12/2005 | Dings et al. | |
| 6,981,114 B1 * | 12/2005 | Wu et al. | 711/162 |
| 6,981,177 B2 * | 12/2005 | Beattie | 714/20 |
| 6,993,537 B2 * | 1/2006 | Buxton et al. | 707/104.1 |
| 2001/0010070 A1 | 7/2001 | Crockett et al. | |
| 2001/0049749 A1 | 12/2001 | Katsuragi et al. | |
| 2001/0056439 A1 | 12/2001 | Carro | |
| 2002/0016827 A1 | 2/2002 | McCabe et al. | |
| 2002/0056438 A1 | 5/2002 | McCoy et al. | |
| 2002/0078244 A1 | 6/2002 | Howard | |
| 2003/0074523 A1 | 4/2003 | Johnson | |
| 2003/0115225 A1 | 6/2003 | Suzuki et al. | |
| 2003/0135650 A1 | 7/2003 | Kano et al. | |
| 2003/0177306 A1 | 9/2003 | Cochran et al. | |
| 2003/0195903 A1 | 10/2003 | Manley et al. | |
| 2003/0220935 A1 | 11/2003 | Vivian et al. | |
| 2003/0229764 A1 | 12/2003 | Ohno et al. | |
| 2004/0010487 A1 | 1/2004 | Prahlad et al. | |
| 2004/0030837 A1 | 2/2004 | Geiner et al. | |
| 2004/0044828 A1 | 3/2004 | Gibble et al. | |
| 2004/0059882 A1 | 3/2004 | Kedem et al. | |
| 2004/0088508 A1 | 5/2004 | Ballard et al. | |
| 2004/0117572 A1 | 6/2004 | Welsh et al. | |
| 2004/0128470 A1 | 7/2004 | Hetzler et al. | |
| 2004/0139128 A1 * | 7/2004 | Becker et al. | 707/204 |
| 2004/0153558 A1 | 8/2004 | Gunduc et al. | |
| 2004/0163009 A1 | 8/2004 | Goldstein et al. | |
| 2004/0172577 A1 | 9/2004 | Tan et al. | |
| 2004/0250033 A1 | 12/2004 | Prahlad et al. | |
| 2005/0027892 A1 | 2/2005 | McCabe et al. | |
| 2005/0039069 A1 | 2/2005 | Prahlad et al. | |
| 2005/0108302 A1 * | 5/2005 | Rand et al. | 707/204 |
| 2005/0193031 A1 | 9/2005 | Midgley et al. | |

FOREIGN PATENT DOCUMENTS

| | | |
|---|---|---|
| WO | WO97/09676 A1 | 3/1997 |
| WO | 03/092116 | 11/2003 |

OTHER PUBLICATIONS

Hunnicutt, Ray et al, "Mission Data Storage Consolidation (MDSC)", Space Ops 2002, Paper ID: T2071, pp. 1-8.

Thatte, Satis M., "Persistent Memory: A Storage Architecture for Object-Oriented Database Systems", ACM/IEEE OODBS 1986, pp. 148-159.

Elnozahy, E.N. et al, "A Survey of Rollback-Recovery Protocols in Message-Passing Systems", ACM Computing Surveys, vol. 34, No. 3. Sep. 2002, pp. 375-408.

QiNetix Quick Recovery: Snapshot Management and Recovery, CommVault Systems, 2005, 2 pages.

QiNetix: Quick Recovery for Microsoft Exchange, CommVault Systems, 2003, 2 pages.

Park, Taseoon et al, "An Efficient Recovery Scheme for Mobile Computing Environments", Proceedings 8th International Conference on Parallel and Distributed Systems, 2001, 8 pages.

Bohannon et al, "Distributed Multi-Level Recovery in Main-Memory Databases", Proceedings of the 4th International Conference on Parallel and Distributed Information Systems, 1996, pp. 45-55.

Lomet et al, "Efficient Transparent Application Recovery in Client-Server Information Systems", Proceedings of 1998 ACM SIGMOD International Conference on Management of Data, 1998, pp. 460-471.

USSN 09/588,242, filed Jun. 6, 2000 to Lloyd Alan Poston.

* cited by examiner

FIG. 9

| CHECKPOINT INFORMATION 1001 | ADDRESS (LOGICAL STORAGE NO., ADDRESS IN LOGICAL STORAGE) 1002 | DATA LENGTH 1003 | WRITE DATA (before) 1004 | WRITE DATA (after) 1005 |
|---|---|---|---|---|
| CHECKPOINT FLAG 1006 | CPID 1007 | PROCESSING SEQ. NO. 1008 | PROCESSING TIME 1009 | |

FIG. 12

| 1311 | 1312 | 1313 | 1314 | 1321 | 1322 | 1323 |
|---|---|---|---|---|---|---|
| LOGICAL STORAGE NO. TO HOST | ADDRESS IN LOGICAL STORAGE TO HOST | LOGICAL STORAGE NO. IN STORAGE SYSTEM | ADDRESS IN STORAGE | RAID Group NO. | PHYSICAL STORAGE NO. | ADDRESS IN PHYSICAL STORAGE |
| Port#、LU# | 0~512 | Cu#、LDEV# | 0~512 | 00 | 00 | 0~512 |
| ... | ... | ... | ... | ... | ... | ... |

(1301 ... 1304, 1300)

| 1331 | 1332 | 1333 | 1334 | 1335 |
|---|---|---|---|---|
| LOGICAL STORAGE NO. TO HOST | LOGICAL STORAGE NO. IN STORAGE SYSTEM | RAID Group NO. | Pair INFORMATION | JOURNAL OBJECT MODE |
| 01234567、01 | 00、01 | 00、01 | Pair Duplex | MODE OFF |
| 01234567、02 | 00、02 | 01、01 | No Pair | MODE OFF |
| 01234567、03 | 00、03 | 02、01 | Pair Symplex | MODE ON |
| ... | ... | ... | ... | ... |

(1330)

| 1351 | 1352 | 1353 | 1354 | 1355 |
|---|---|---|---|---|
| LOGICAL STORAGE NO. IN STORAGE SYSTEM | AVAILABLE/ RESERVED INFORMATION | Path DEFINITION INFORMATION | Emulation Type, SIZE | FAULT INFORMATION |
| 00、01 | NONE | PATH DEFINED CONNECTION Port # | OPEN : 72G | NONE |
| 00、02 | NONE | PATH DEFINED CONNECTION Port # | OPEN : 72G | NONE |
| ... | ... | ... | ... | ... |
| 0A、01 | RESERVED FOR SNAPSHOT | NONE | OPEN : 36G | NONE |
| 0A、02 | AVAILABLE | NONE | OPEN : 36G | NONE |
| ... | ... | ... | ... | ... |

| 1401 | 1402 | 1403 | 1404 | 1405 PAIR MANAGEMENT INFORMATION | |
|---|---|---|---|---|---|
| LOGICAL STORAGE NO. TO HOST | LOGICAL STORAGE NO. IN STORAGE SYSTEM | Emulation Type, SIZE | PAIR STATE | 1411 MAIN | 1412 SUBOR-DINATE |
| 11234567, 01 | 01, 01 | OPEN 9G | Pair Duplex | 0 | 02, 01 |
| 11234567, 02 | 01, 02 | OPEN 9G | Pair Symplex | 02, 02 | 0 |
| 11234567, 03 | 01, 03 | OPEN 16G | No Pair | −1 | −1 |
| 11234567, 04 | 01, 04 | OPEN 16G | Pair Resync | 02, 04 | 0 |
| ... | ... | ... | ... | ... | ... |
| 11234567, 0A | 0D, 0A | 3390 3G | Pair Create | 0A, 0A | 0F, 0A |
| ... | ... | ... | ... | ... | ... |

FIG. 14

| CHECKPOINT ID 1501 | ADDRESS 1502 | TIME 1503 |
| --- | --- | --- |
| ABCDEF12 | 12 | 2002.06.02 09:00:00 |
| ABCDEF19 | 1A2B3C56 | 2002.06.02 21:00:00 |
| ... | ... | ... |
| 0345FCA9 | 3ADE68B0 | 2002.06.12 09:00:00 |

1500

| LOGICAL STORAGE NO. TO STORE JOURNAL DATA 1521 | CHECKPOINT ID 1522 | ADDRESS 1523 |
| --- | --- | --- |
| 01, 0F | ABCDEF12 | 0 |
| 01, 0F | ABCDEF19 | FEDCBA12 |
| ... | ... | ... |

| | CHECKPOINT ID | TIME |
|---|---|---|
| DEVICE NO: 010F | I | 2002.05.05 14:00:00 |
| | J | 2002.05.05 15:00:00 |
| | …… | …… |
| | CHECKPOINT ID | TIME |
| DEVICE NO: 0B03 | I | 2002.05.05 14:00:00 |
| | J | 2002.05.05 15:00:00 |
| | …… | …… |

DATA RESTORING METHOD AND AN APPARATUS USING JOURNAL DATA AND AN IDENTIFICATION INFORMATION

BACKGROUND OF THE INVENTION

In an information processing system, it possibly occurs that online or batch processing terminates in an abnormal state due to a bag of a program or a failure of a storage system, and data stored in the storage system of the information processing system becomes inconsistent depending on cases. Moreover, data stored in the storage system is erased by a mistake of a human in many cases.

To restore the data of the information system in such a state, there exists a data restoration technique using data backup and restoration in which the inconsistency of data is removed to resume the processing stopped at an intermediate point thereof or the processing stopped at an intermediate point is again executed.

U.S. Pat. No. 5,263,154 describes a prior art regarding the backup and restoration. The article describes a technique in which data stored in a storage system at a point of time specified by a user is copied onto a magnetic tape without stopping data input/output (I/O) instructed from a computer (or a host) connected to the storage system (data backup) and then restores (restoration) the data using the copied data (backup data).

On the other hand, JP-A-2001-216185 describes a technique to reduce a period of time required for the restoration of data in which information of fields in which data is updated after the data backup is executed is kept as differential information. When data stored in a storage is restored using the backup data, only part of the data indicated by the differential information is used to restore the data.

SUMMARY OF THE INVENTION

In the restoration processing described in U.S. Pat. No. 5,263,154, when the backup data is read from the magnetic tape, a part of data not updated after the point of time when the backup data is obtained (the part of data on the magnetic tape of which the contents are equal to those of the data of the storage system) is also read from the magnetic tape to be written in the storage system. Such a data transfer operation transfers unnecessary data and hence elongates the period of time required for the restoration.

On the other hand, in the technique described in JP-A-2001-216185, the readout is not conducted for the duplicated data, and hence the period of time required for the restoration is reduced when compared with U.S. Pat. No. 5,263,154. However, even in these techniques, the data restoration cannot be conducted for data updated from when the data backup is conducted to when the storage system fails. When it is desired to restore the data updated after the data backup, the host side must control or manage information such as the contents of update of the data using, for example, a log. This increases load imposed on the host and requires a long period of processing time.

To solve the above problem according to the present invention, there is provided a configuration as follows. That is, in an information processing system including a computer and a storage system coupled to the computer system, the storage system includes a controller and a plurality of storages. In the configuration, the storage system copies, in response to a predetermined indication, data stored in a storage onto another storage. Thereafter, the storage system stores the update of data on the storage as the source unit in another storage, the data update being used as an update history. On the other hand, the computer creates identification information at a particular time after the copy is created and sends the identification information to the storage system. Having received the identification information, the storage system stores the identification information with a relationship established between the identification information and the update history.

When it is desired to restore data, the computer sends identification information to the storage system. Having received the identification information, the storage system accesses the recorded identification information to retrieves therefrom identification information matching the received identification information. When matching identification information is detected, the storage system restores the data in the storage as the source unit using the data stored in the storage as the destination unit and the contents of update history recorded before update information related to the matching identification information.

It is considerable that the present invention is configured such that the computer to request update of data to the storage system is other than the computer to create the identification information.

It is also possible to configure the present invention such that the computer to create the identification information stores the identification information in the computer.

In the present invention, there can also be considered a configuration in which information about identification information stored in the computer is presented to the user and then information identification specified by the user is sent to the storage system.

It is considerable to configure the present invention as follows. The configuration includes a computer including a central processing unit (CPU) and a storage system including a storage. The computer includes a unit to request the storage system to create and to store a copy of data stored in the storage, a unit to request the system to record an update part of data updated by processing of the computer, and a unit to transmit identification information identifying a state of the system at a point of time to the storage system. The storage system includes a unit to create and to store a copy of data of the storage in response to a request from the computer, a unit to keep, when the contents of the storage are updated, data before update, data after update, and an update location in the form of journal data; a unit to keep and to identify identification information sent from the computer, and a unit to relate the journal data to the identification information. The computer also includes a unit to send, at occurrence of a case in which the contents of the storage are required to be restored to a state at a particular point of time, a data restoration request to the storage system with state identification information specified for the request. The storage system includes a unit to identify the state identification information sent from the computer to restore data using the copy of data and the journal data.

According to the present invention, there is also provided a data restoration method in which one identification information item is shared between a computer and a storage system. The storage system control or manages the identification information item with a relationship established between the identification information item and an update history. In response to an identification from the computer, the storage system restores data stored in the storage to an update history indicated by a particular identification information item.

Other objects, features and advantages of the invention will become apparent from the following description of the embodiments of the invention taken in conjunction with the accompanying drawings.

BRIEF DESCRIPTION OF THE DRAWINGS

FIG. 9 is a diagram showing a format example of journal data;

FIG. 12 is a diagram showing a configuration example of device management information;

FIG. 13 is a diagram showing a configuration example of pair management information;

FIG. 14 is a diagram showing a configuration example of journal management information;

FIG. 16 is a diagram showing a configuration example of system determination information 1608;

DESCRIPTION OF THE EMBODIMENTS

Figure 1:
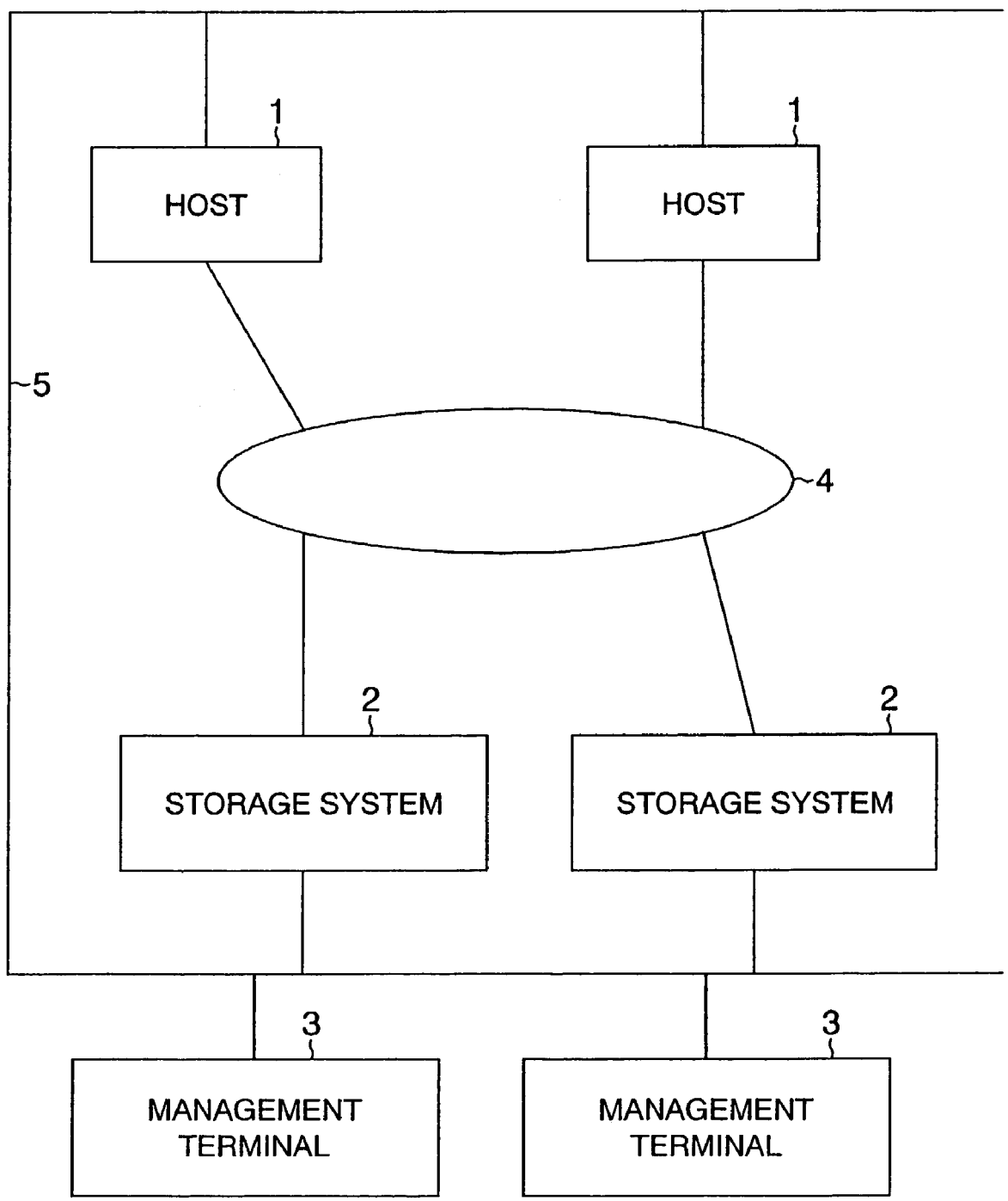
FIG. 1 is a diagram showing a configuration example of a first embodiment of an information processing system.

Next, referring to the drawings, description will be given of a first embodiment of the present invention. The present invention is not restricted by the embodiment. In the following description, "a storage system" includes a storage such as a disk unit and a system such as a disk array including a plurality of storages.

FIG. 1 shows a first embodiment of an information processing system according to the present invention. The information processing system includes hosts 1, storage systems 2, management terminals 3, a network 4 to couple the hosts 1 with the storage systems 2, and a network 5 to couple the hosts 1, the storage systems 2, and the management terminals 3 with each other.

The host 1 is a computer such as a personal computer, a workstation, or a main frame. In the host 1, there operate an operating system (OS) corresponding to a type of a computer of the host 1 and application programs (AP) for various jobs and purposes, for example, a database (DB) program. Although two hosts 1 are used in the embodiment for simplicity, a desired number of hosts 1 may be connected to the networks 4 and 5.

The management terminal 3 is a computer used to control or to manage, for example, failure, maintenance, configurations, and performance information of the storage systems 2. For example, the management terminal 3 is used by a manager of the information processing system to set logical storages in the storage systems 2, to set storage areas to back up data, or to set a pair of storage areas to copy data. To conduct maintenance and management of the storage system, to set physical storages 10 of the storage systems 2, and to set the hosts 1 to be connected to the storage systems 2, the manager of the information processing system inputs contents to be set to the system from the management terminal 3. The management terminal 3 sends the contents inputted by the manager via the network 5 to the storage systems 2 and the hosts 1.

The network 4 is used by the hosts 1 to send an I/O processing request and other information to the storage systems 2. The network 4 includes, for example, an optical cable, and a copper line. Moreover, the network 4 uses communication protocols such as ethernet, fiber distributed data interface (FDDI), fiber channel, small computer system interface (SCSI), infiniband, transmission control protocol/internet protocol (TCP/IP), and ISCSI.

The network 5 is used as follows. The storage system 2 sends control or management information such as information of failure, maintenance, a configuration, and performance thereof via the network 5 to the management terminal 3 and the host 1. The management terminal 3 and the host 1 acquire control information from the storage systems 2 via the network 5. The network includes a cable and a communication protocol, which may be the same as those of the network 4 or may be different therefrom.

Figure 2:
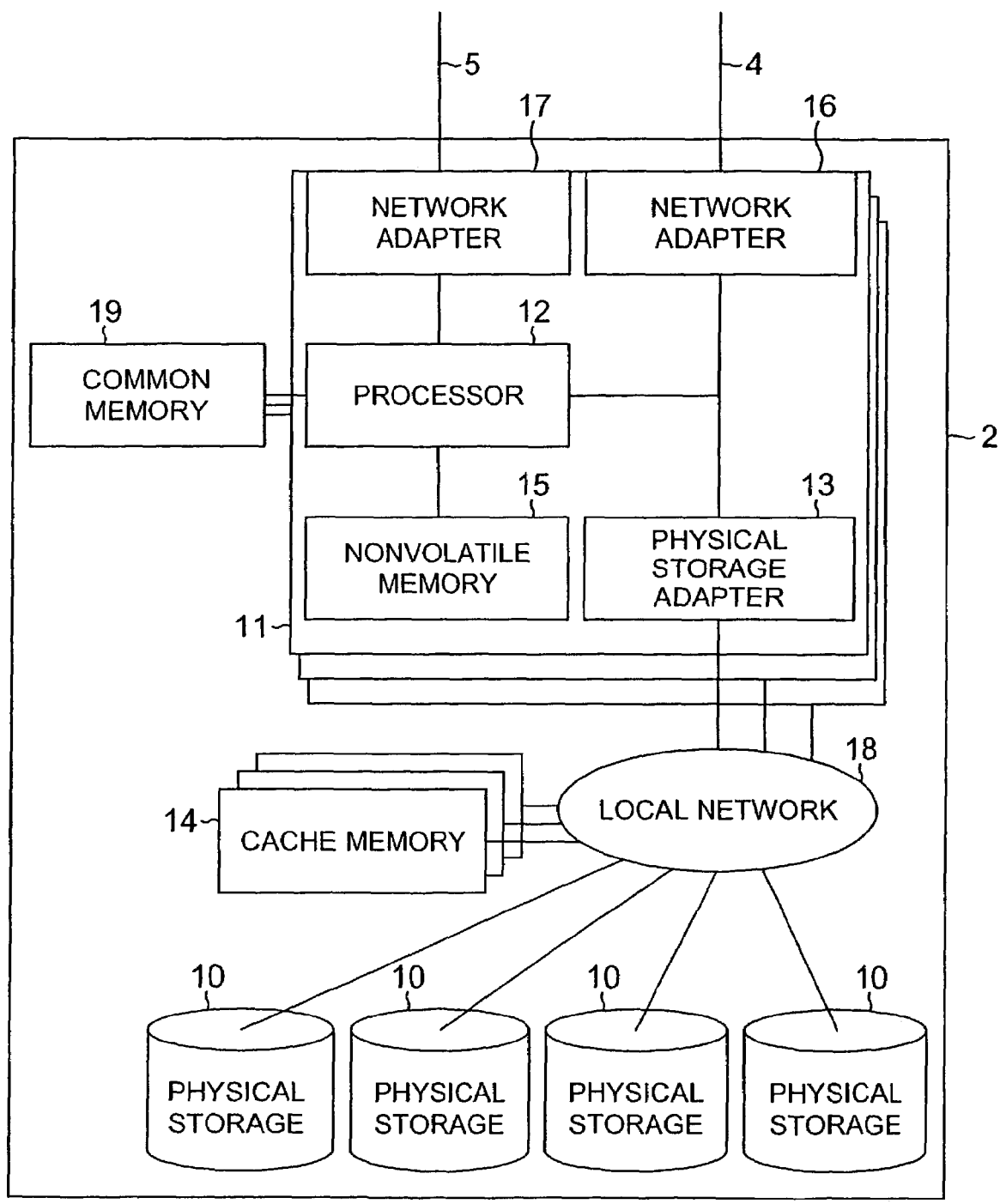
FIG. 2 is a diagram showing a configuration example of a storage system 2.

FIG. 2 shows a configuration of the storage system 2 in the embodiment. Each of the storage systems 2 stores data and programs used by the hosts 1. The storage system 2 receives an I/O processing request from the host 1, executes processing associated with the I/O processing request, and sends a result of the processing to the host 1 predetermined in advance.

The storage system 2 includes storage controllers 11, physical storages 10, cache memories 14, a common or shared memory 19, and a local network 18.

The physical storages 10 store data to be used by the user. The physical storages 10 include magnetic disks which are electrically nonvolatile storage media and/or nonvolatile semiconductor memories such as a silicon disk, an optical disk, a magnetooptical disk, or a hard disk. Incidentally, to prevent data loss at occurrence of failure in a storage area of the physical storage 10, the storage system 2 may be constructed in a redundancy array independent disk (RAID) configuration having redundancy.

The storage controller 11 is a device to process an I/O request from the host 1 and to control the physical storages 10. The storage controller 11 includes a physical storage network adapter 13 connected to the physical storages 10, a processor 12 to execute predetermined programs, a nonvolatile memory 15 to store programs to be executed by the processor 12, information necessary for operation of the programs, setting information and configuration information of the storage system 2, and the like; a network adapter 17 to connect the storage system 2 to the network 5, and an I/O network adapter 16 to connect the storage system 2 to the network 4.

The storage system 2 may include a plurality of storage controllers 11. To guarantee redundancy of the storage system 2, each constituent component of the system 2, for example, a circuit to supply power to each constituent element of the storage controller 11, the cache memory 14, the nonvolatile memory 15, the local network 18, and the physical storage adapter 13 may be respectively duplicated in a redundant configuration.

The cache memory 14 is a recording medium to temporarily store data inputted from the host 1 to the storage system 2 and data transferred from the storage system 2 to the host 1.

The common or shared memory 19 is a nonvolatile memory to store information shared between the storage controllers 11 and the processors 12. For example, the shared memory 19 stores an exclusive processing bit to access a particular areas in the cache memory 14 for I/O processing and information indicating a correspondence between the physical storages 10 and the cache memories 14. The local network 18 connects the storage controllers 11, the cache memories 14, and physical storages 10 to each other. The local network 18 may be constructed, for example, in a configuration of shared bus type or in a network configuration of star type.

Figure 3:
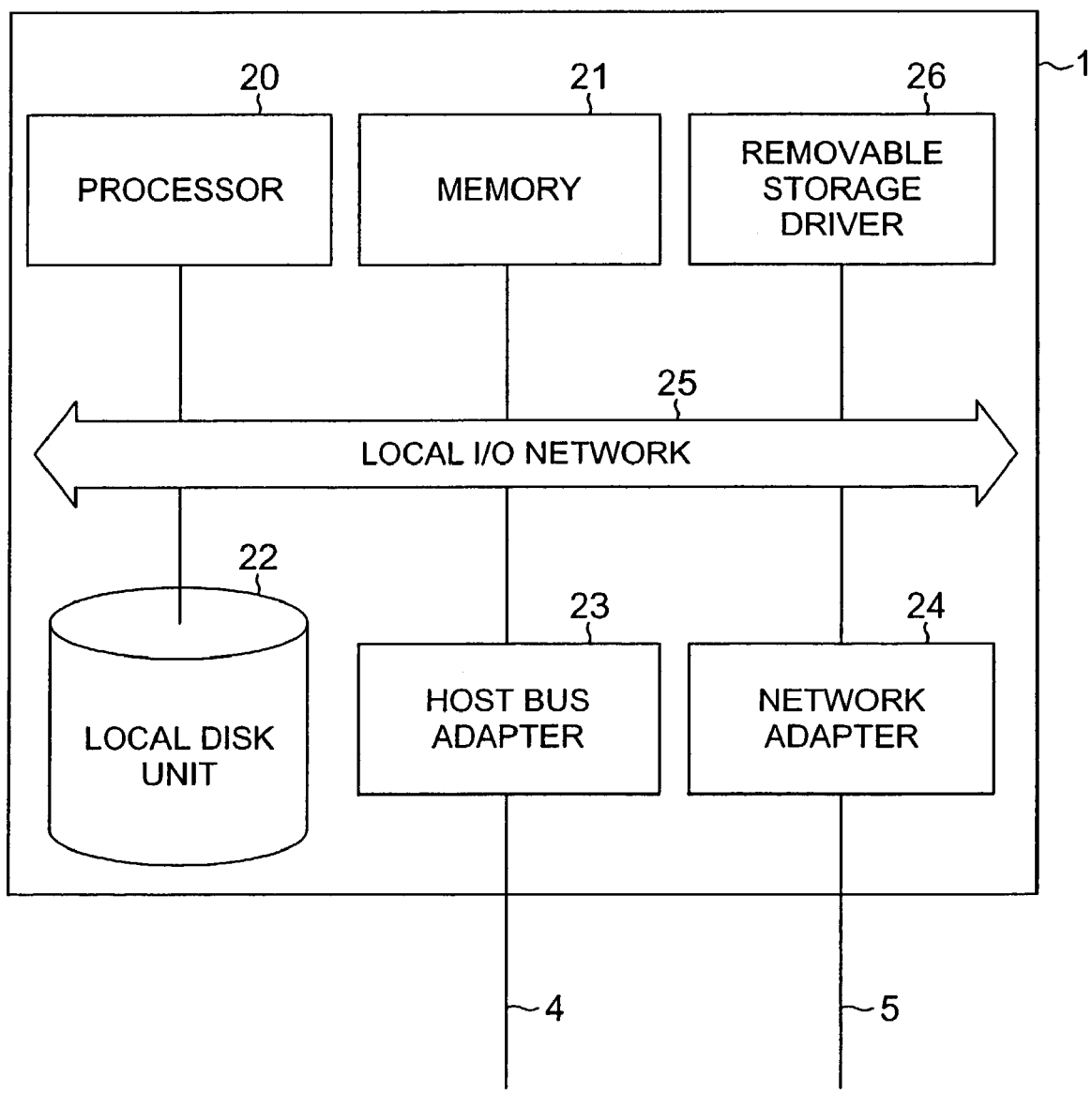
FIG. 3 is a diagram showing a configuration example of a host 1.

FIG. 3 shows a configuration of the host 1. The host 1 includes a processor 20 to execute predetermined programs, a memory 21 to store operating systems and application programs to be executed by the processor 20 and data to be used by the application programs, a local disk unit 22 to store operating systems and application programs and data to be used by the application programs, a host bus adapter 23 to connect the network 4 to the host 1, a network adapter 24 to connect the network 5 to the host 1, a removable storage driver 26 to control readout of data from a removable storage medium such as a floppy disk, and a local I/O network 25 to connect these constituent components to transfer data and control data of operating systems and application programs.

The removable storage media used by the removable storage driver 26 include a compact disk-read only memory (CD-ROM), a CD-read (R), a CD-read/write (RW), optical disks such as a digital versatile disk (DVD) and a magnetooptical (MO) disk, a photomagnetic disk, and magnetic disks such as a hard disk and a floppy disk. Each program which will be described later is read from the movable storage medium via the removable storage driver 26 or is fed via the network 4 or 5 to be installed in the local disk unit 22 of the host 1.

To guarantee redundancy, the host 1 may include a plurality of constituent components, for example, a plurality of processors 20.

Figure 4:
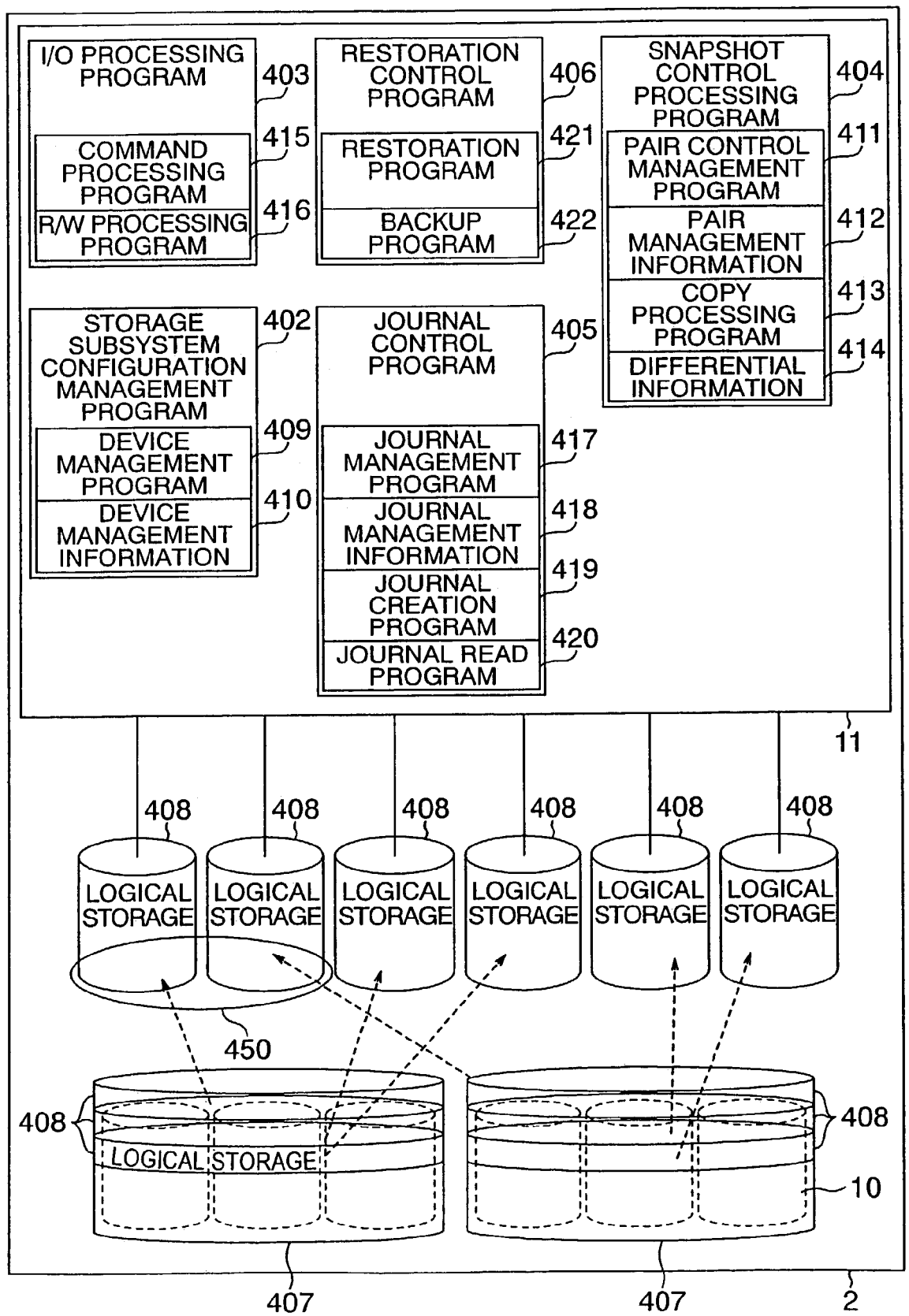
FIG. 4 is a diagram showing a configuration example of programs and other elements of the storage system 2.

FIG. 4 shows a configuration of programs in the storage system 2 and a logical configuration thereof. In the storage system 2, one or more physical storages 10 (indicated by a dotted line) are used in combination to configure parity groups 407 having redundancy. The parity group 407 is a set including a physical storage 10 to store data and a physical storage 10 to store redundant data created using the data thus stored. The storage system 2 supplies to the host 1 logical storage areas as logical storages 408. The logical storage areas are obtained from the storage area space of the physical storages 10 in the parity groups 407. Therefore, the host 1 recognizes that the storage system 2 includes storages (logical storages 408) connected to the storage controller 11 as shown in FIG. 4.

To control processing in the storage system 2, the storage controller 11 includes in the nonvolatile memory 15 an I/O processing program 403, a replication control processing program 404, a storage subsystem configuration management program 402, a restoration control program 406, and programs of the journal controller 405.

The storage controller 11 executes these programs by the processor 12 to control processing described below.

The I/O processing program 403 further includes a command processing program 415 and a read-write processing program 416. Having received an I/O processing request from the host 1 via the network interface 17, the storage controller 11 executes the command processing program 415 to analyze the contents of the I/O processing request. As a result of the analysis, if the contents of the I/O processing request indicate a data read I/O request (read I/O) or a data write I/O processing request (write I/O), the storage controller 11 executes the read-write processing program 416.

For a write I/O processing request, the storage controller 11 controls operation as follows. The controller 11 executes reply processing for the write I/O processing request from the host 1 (a reply to notify whether or not the storage controller 11 is in a state to receive data actually transferred from the host 1). The storage controller 11 writes update data (write data) transferred thereto in a predetermined location of the cache memory 14 or the physical storage 10. Or, the storage controller 11 writes write data stored in the cache memory 14 in the physical storage 10. For a read I/O processing request, the storage controller 11 controls processing as follows. The controller 11 reads data (read data) corresponding to the read I/O processing request from a predetermined location of the cache memory 14 or the physical storage 10 and transfers the data to the host 1. Or, the controller 11 reads read data from the physical storage 10 to store the data in the cache memory 14.

For other processing, for example, processing of an inquiry command of SCSI (a command to indicate a device search), the storage controller 11 executes the command processing program 415 to control operation corresponding to the contents of the processing.

The storage subsystem configuration management program 402 includes device management information 410 and a device management program 409. The device management information 410 includes tables to keep mapping information indicating a correspondence between addresses of the logical storages 408 and those of the physical storages 10, information regarding the physical storages 10 constituting the parity groups 407, information regarding snapshot pairs 450, and journal data storage objective information.

The device management program 409 is a program executed by the storage controller 11 to control the device management information 410. By executing the device management program 409, the storage controller 11, for example, sets a logical storage 408 as a target of storage of a definition of a logical storage 408 and a snapshot inputted from the management terminal 3 and registers information as an object for which journal data is stored.

To execute read-write I/O processing for data, the storage controller 11 executes the device management program 409 to calculate an address of one of the physical storages 10 corresponding to an address of the logical storage 408 from which read data specified by the read-write I/O processing request is read or in which write data specified by the read-write I/O processing request is written. Using a result of the calculation, the storage controller 11 accesses the physical storage 10.

The journal management program 405 includes a journal creation program 419 executed when the storage controller 11 creates journal data, a journal read program 420 executed when the storage controller 11 reads journal data created in advance, journal management information 418 to which information regarding the logical storage 408 as an object journal acquisition is registered, and a journal management program 417 executed when the storage controller 11, for example, sets journal management information 418.

If a write I/O processing request is received when the storage controller 11 obtains journal data (a journal mode), the storage controller 11 executes the journal creation program 419 to write write data in the cache memory 14 and to write previous data (write objective data) existing at a location to store the write data and the write data in a predetermined area reserved in the cache memory 14 for journal data creation.

The write objective data and the write data stored in the cache memory 14 are stored as journal data of an update history in the logical storage 408 (journal logical storage hereinbelow) to store journal data. The storage controller 11 executes the restoration manager 406 and the journal read program 420 to sequentially read, according to an indication from the host 1, journal data stored in the journal logical storage 408 to write the journal data in the storage area of the logical storage 408 as a copy destination or the logical storage 408 as a copy source indicated by an address of the journal data thus read from the journal logical storage 408.

The snapshot control program 404 includes a copy processing program 413, differential information 414, a pair control management program 411, and pair management information 412. By executing the pair control management program 411, the storage controller 11 executes, according to an indication from the host 1, pair creation (pair create), pair split (pair split), pair re-synchronization (pair resync), or pair deletion (pair delete) for a logical storage 408 (a main logical storage) and a logical storage 408 (a subordinate logical storage) to store a copy of data stored in the main logical storage 408. In the description, "pair" indicates a pair including a main logical storage and a subordinate logical storage corresponding thereto (a snapshot pair 450).

For one main logical storage, a plurality of subordinate logical storages may be set and created. Also, it is possible that a subordinate logical storage is specified as a new main logical storage and a subordinate logical storage is set and created to be paired with the new main logical storage.

The pair management information 412 is used to register information indicating that a snapshot pair 450 of logical storages is in a pair synchronous state of a pair duplex state, a pair asynchronous state of a pair duplex state, a pair creation state (pair create), or a pair simplex state. The pair synchronous state is a state in which a main logical storage and a subordinate logical storage are synchronously updated by a write I/O from the host 1. The pair asynchronous state is a state in which a main logical storage and a subordinate logical storage are asynchronously updated by a write I/O from the host 1. In the pair asynchronous state, write data is managed by the differential information 414 until update of the main logical storage is reflected in the subordinate logical storage.

The differential information 414 is used to keep, for example, address information indicating, when a pair of a main logical storage and a subordinate logical storage is in the pair asynchronous or simplex state, a part of difference between the main logical storage and the subordinate logical storage caused by occurrence of a data write operation in the main logical storage.

By executing the copy processing program 413, the storage controller 11 copies, at pair creation, data from the main logical storage onto the subordinate logical storage beginning at a first address of the main logical storage to back up data, namely, to produce backup data of the main logical storage in the subordinate logical storage. Moreover, the storage controller 11 refers to the differential information 414 to copy data of the differential part from the main logical storage onto the subordinate logical storage. Conversely, the storage controller 11 refers to the differential information 414 to copy data of the differential part from the subordinate logical storage onto the main logical storage.

The backup/restoration control program 406 includes a restoration program 421 and a backup program 422. By executing the restoration program 421, the storage controller 11 restores, according to a restoration request from the host 1, data of a logical storage specified by the request. The restoration processing will be described later in detail.

The backup program 422 is executed when the storage controller 11 creates, according to, for example, an indication from the host 1, a copy of a logical storage 408 or transfers data of the storage system 2 to another storage, for example, onto a tape.

Figure 5:
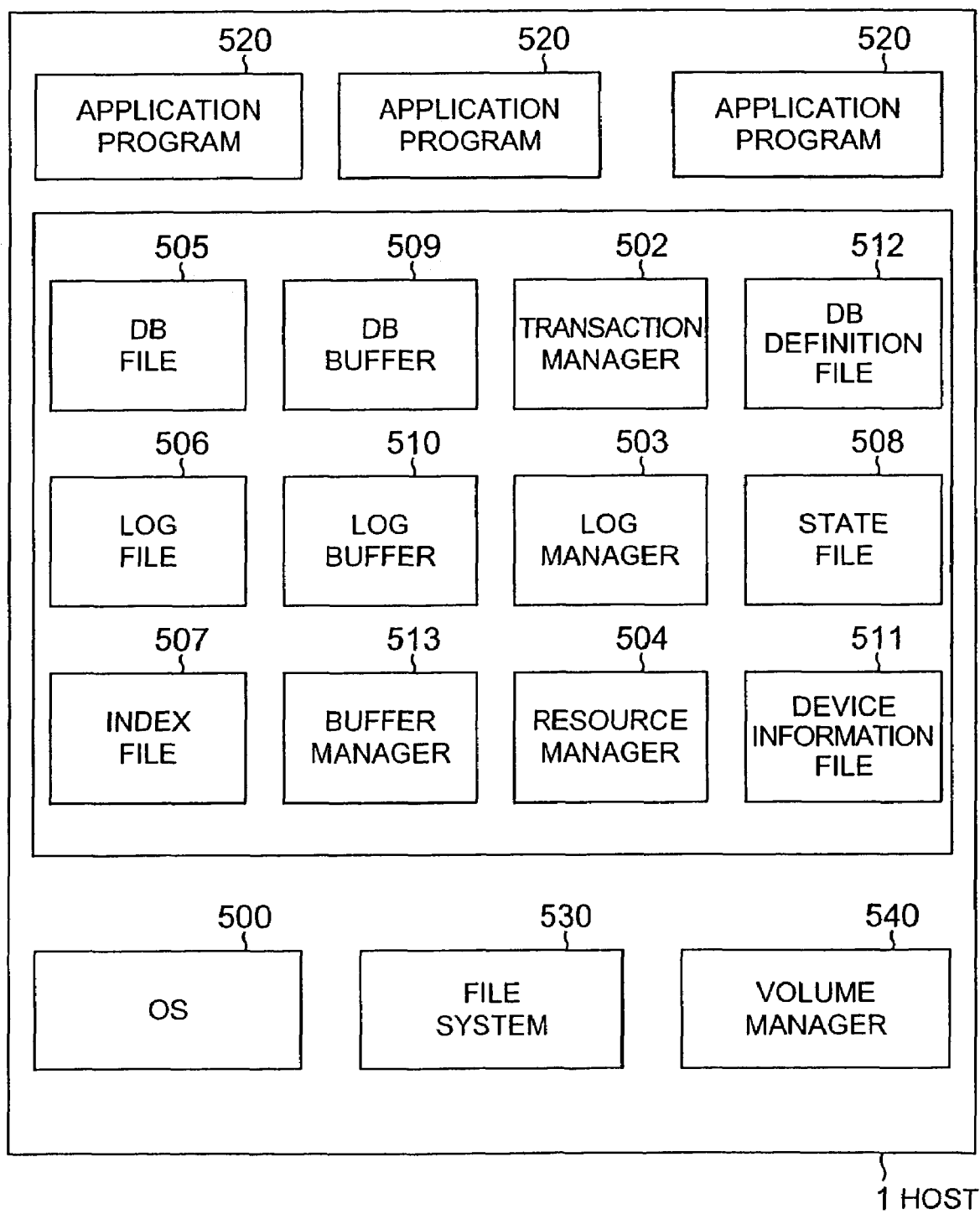
FIG. 5 is a diagram showing a configuration example of programs of the host 1.

FIG. 5 is a diagram showing examples of programs to operate on the host 1 and data used by the programs. These programs are stored in a local disk unit 22 or a memory 21 of the host 1 and are executed by the processor 20. The host 1 includes a database management software (DBMS) 501 as an application program to operate under an operating system (OS) 500. The database management software 501 accesses the storage system 2, for example, via the operating system 500, a file system (FS) 530, or a volume manager (VM) 540. The database management software 501 communicates I/O processing such as transaction processing with another application program 520 of the user.

The database management software (DBMS) 501 includes a database (DB) file 505, a log file 506, an index file 507, a database buffer (509), a log buffer 510, a device information file 511, a state file 508, a database definition file 512, a transaction manager 502, a log manager, a buffer manager 513, and a resource manager 504.

The database buffer 509 is an area disposed to improve processing performance of the database management software 501. The area is exclusively reserved in the memory 21 of the host 2 for the software 510. The buffer 509 temporarily keeps data frequently accessed by the software 501. Like the buffer 509, the log buffer 510 is also reserved in the memory 21 to temporarily store a processing record (a log record) of the software 501.

The database file 505 includes database data such as database tables. The tables are actually stored in a physical storage 10 of the storage system 2. The database buffer 509 temporarily stores data such as tables frequently used, and the software 501 executes transaction processing using the data. If the data requested for the processing is not in the buffer 509, the software 501 reads data from the storage system 2.

Also, the log file 506 is actually stored in a physical storage 10 of the storage system 2. The log file 506 sequentially stores log data of processing such as transaction processing by the software 501. The log data includes an identifier of an application program having executed the processing, a processing sequence identifier, a point of processing time, data after processing, data before processing. In a recording operation, data is additionally recorded in a sequential way using the log buffer 510. When the application program 520 commits information to memory in a concordant state after a sequence of processing or when the software 501 executes sync processing to store dirty data stored in a buffer in a physical storage 10 at an interval of a fixed period of time or at an interval of a fixed number of transactions, the log file 506 records pertinent information indicating the condition.

By executing the transaction manager 502, the host 1 executes transaction processing for a database, reads data stored in the log file 506 to execute data recovery, or controls a checkpoint. By executing the log manager 503, the host 1 controls input and output operations for a database.

Next, an outline of operation of the embodiment will be described. In the embodiment of an information processing system, the storage system 2 creates a main logical storage and a subordinate logical storage including backup data (snapshot data) of data contained in the main logical storage at a particular point of time and then keeps the main and subordinate logical storages. Each time a write I/O request is received from the host 1 after the snapshot is created, the storage system 2 records data before write I/O processing and data after write I/O processing (write data and write objective data) as journal data (update history).

The host 1 notifies to the storage system 2 checkpoint information ("CP information), i.e., a particular identification information created by the host 1. Specifically, the host 1 writes checkpoint information in journal data of the storage system 2 at a particular point of time, for example, at processing (sync processing) to match data between the host 1 and the storage system 2. As a result, the storage system 2 keeps checkpoint information equal to that created by the host 1. That is, the checkpoint information controlled only by the host 1 in the prior art is controlled by both of the host 1 and the storage system 2. Resultantly, by using checkpoint information indicated by the host 1 and that stored in the journal data of the storage system 2, the storage system 2 restores at a high speed a state of data contained in the storage system 2 at a point of time (at creation of the checkpoint information) desired by the host 1.

To execute such processing, the host 1 beforehand sends to the storage system 2 an indication to prepare for acquisition of journal data (journal acquisition preparation indication) and a journal acquisition start indication. In response thereto, the storage system 2 starts acquiring journal data and enters the journal mode. Thereafter, the information processing system communicates checkpoint information described above.

Next, description will be given of processing executed by the storage system 2 when the host 1 issues a journal acquisition preparation indication to the storage system 2.

The journal acquisition preparation indication includes information to specify a journal logical storage and indication to create a main logical storage and a subordinate logical storage. Having received the journal acquisition preparation indication, the storage system 2 executes, for example, allocation of a data storage area according to the indication. The main and subordinate logical storages may be in a snapshot pair 450 before the journal acquisition preparation indication is received. However, in the embodiment, the storage system sets a new snapshot pair 450 using logical storages 408 according to the indication.

The storage system 2 then creates snapshot data of the main logical storage in a specified subordinate logical storage. Specifically, the storage system 2 copies, onto the subordinate logical storage, data already stored in the main logical storage when the storage system 2 receives the journal acquisition preparation indication to synchronize the state between the main and subordinate logical storages. When the specified subordinate logical file is a subordinate logical storage which is in a snapshot pair 450 with a main logical storage before the journal acquisition preparation indication is issued, the storage system 2 only sets the subordinate and main logical storages to a synchronous state.

According to the indication from the host 1, the storage system 2 also sets. a journal logical storage corresponding to the main logical storage.

Next, the host issues a journal acquisition start indication to the storage system 2. The indication includes a checkpoint identifier (CPID), i.e., first checkpoint information indicating a start of journal acquisition. The storage system 2 records the first CPID received from the host 1 and then starts acquiring journal data. A checkpoint command transmitted from the host 1 thereafter includes a CPID other than the first CPID. The storage system 2 records the CPID as journal data.

Figure 6:
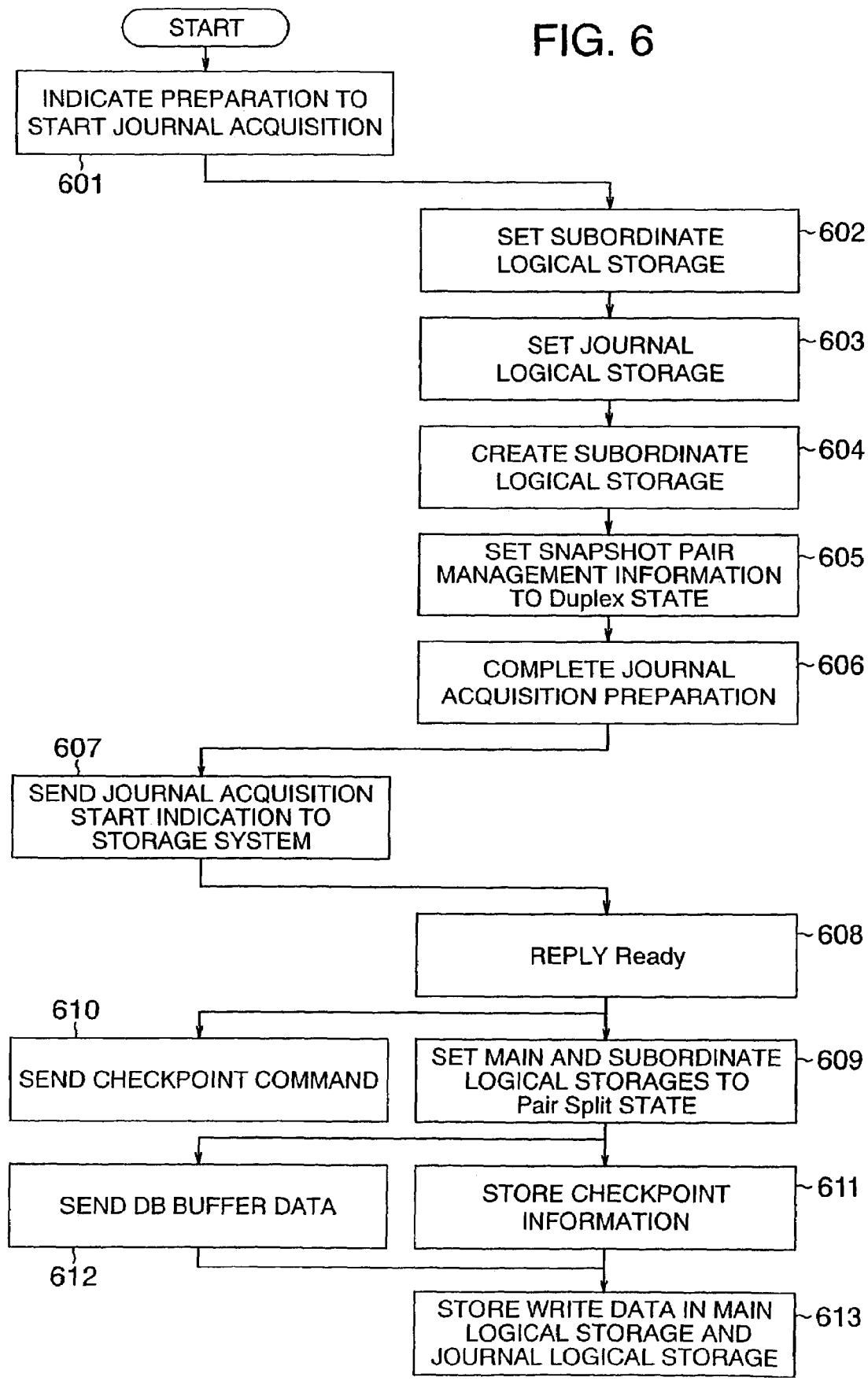
FIG. 6 is a flowchart showing a processing procedure example to prepare for obtaining a journal.

FIG. 6 is a flowchart showing in detail processing of the storage system 2 when a journal acquisition preparation indication and a journal acquisition start indication are received from the host 1.

By executing the database manager 501, the host 1 sends a journal acquisition preparation indication to the storage system 2. In the embodiment, a logical storage 408 having stored database tables to be used by the database manager 501 is specified as a main logical storage. The journal acquisition preparation indication includes an identifier indicating a main logical storage, an identifier indicating a subordinate logical storage to store snapshot data of data stored in the main logical storage at a point of time when the storage system 2 receives the journal acquisition preparation indication, and an identifier indicating a journal logical storage (step 601).

The journal data includes write objective data and write data associated with a write I/O processing request after the snapshot data is created and address information indicating storage positions of these data items in the main logical storage. A specific example of the configuration will be described later.

The subordinate logical storage and the journal logical storage to store snapshot data may be beforehand set according to an indication other than the journal acquisition preparation indication. In this case, it is not necessarily required that the indication includes the identifiers indicating the logical storages 408.

The storage controller 11 having received the journal acquisition preparation indication from the host 1 refers to the device management information 410 using an identifier contained in the indication to indicate a subordinate logical storage and then confirms presence or absence of specification of an invalid device, for example, presence or absence of the specified subordinate logical storage, presence or absence of occurrence of a failure, and a state of a logical storage, for example, whether or not the specified subordinate logical storage is already being used for other processing. If the specified subordinate logical storage is available as a result of the confirmation, the storage controller 11 sets, to the device management information 410, information indicating that the specified subordinate logical storage is being creating a journal, sets journal management information regarding the specified subordinate logical storage to the journal management information 418, and sets the pair creation state (step 602).

Similarly, the storage controller 11 refers to the device management information 410 using an identifier indicating a journal logical storage to confirm presence or absence of specification of an invalid device for the specified journal logical storage and the state of the journal logical storage. If the specified journal logical storage is available, the storage controller 11 registers, to the device management information 410, information indicating that the specified journal logical storage is creating a journal (step 603).

Next, the storage controller 11 executes processing to create snapshot data of the main logical storage in the subordinate logical storage (snapshot creation processing). In the snapshot creation processing, data beforehand stored in the main logical storage at reception of the command indicating journal acquisition preparation processing is sequentially transferred to the subordinate logical storage. In a case in which the indication of journal acquisition preparation does not include any indication of a subordinate logical storage and the management terminal 3 beforehand specifies a subordinate logical storage in a pair of the duplex state or in a case in which even when an indication of a subordinate logical storage is included, if the specified subordinate logical storage is in the duplex state with a main logical storage, it is not necessary to execute the snapshot creation processing.

Assume that the host 1 issues a write I/O processing request for data stored in the main logical storage while the storage system 2 is executing the snapshot creation processing. If write objective data is not yet copied onto the subordinate logical storage when the request is issued, the storage controller 11 writes write data in the main logical storage. If write objective data is already copied onto the subordinate logical storage when the request is issued, the storage controller 11 writes write data in the main logical storage and the subordinate logical storage (step 604).

When the snapshot creation processing is completed, the storage controller 11 sets the pair management information to the duplex state (step 605) and reports the completion of journal acquisition preparation processing to the host 1 from which the indication of journal acquisition preparation is issued. In the snapshot pair 450 in the duplex state, data written in the main logical storage is also reflected in the subordinate logical storage (step 606).

The host 1 having received the completion report of journal acquisition preparation processing sends a journal acquisition start indication to the storage system 2 at particular timing, for example, when the information processing system is in an concordant state; at a specified point of time, or before or after processing of a particular transaction (step 607).

The storage controller 11 having received the journal acquisition start indication confirms that no failure occurs in the journal logical storage and the main and subordinate logical storages beforehand prepared and then returns a ready replay in response to the journal acquisition start indication (step 608).

Thereafter, the storage controller sets the main and subordinate logical storages to the pair split state. Specifically, the storage controller 11 sets a state in which even if a write I/O processing request is received from the host 1, update of the main logical storage is not reflected in the subordinate logical storage at all (step 609).

On the other hand, the host 1 having received the ready reply sends checkpoint information including a checkpoint identifier (CPID) using a checkpoint command (step 610).

The storage system 2 having received the checkpoint information stores, in the journal logical storage, journal data including the received checkpoint information, i.e., the CPID and a processing sequence number and a processing time in the storage system 2. Or, the storage system 2 stores the checkpoint information in the nonvolatile memory 15 or the shared memory 19 of the storage controller 11 (step 611).

Having received the checkpoint command, the host 1 sends write data from the memory 21 of the host 1 to the storage system 2 (step 612).

Having received the write data, the storage controller 11 writes the write data in the main logical storage and then write objective data and the write data in the journal logical storage (step 613).

After the checkpoint command is received, the storage system 2 enters the journal mode to continue acquisition of journal data. At an interval set by a database manager, for example, at an interval of a fixed period of time or a fixed number of transactions, the host 1 sends all data of the database buffer 509 at the pertinent point of time to the storage system 2. At timing to share checkpoint information between the storage system 2 and the host 1, the host 1 sends a checkpoint command indicating the timing to share checkpoint information to the storage system 2.

When the checkpoint command is received in the journal mode, the storage controller 11 stores the checkpoint information as journal data in the journal logical storage, the nonvolatile memory 15, or the shared memory 19.

Figure 7:
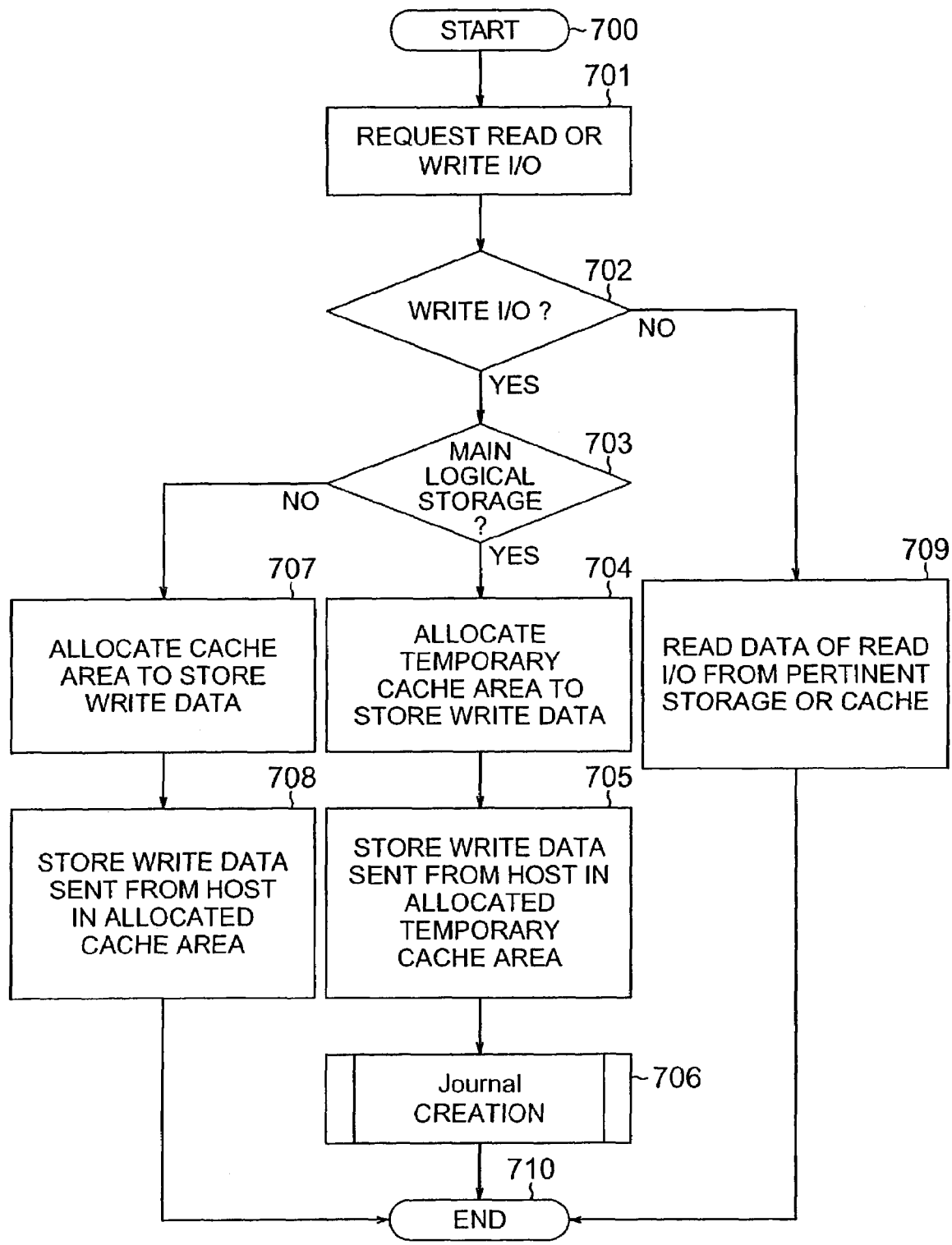
FIG. 7 is a flowchart showing a processing procedure example of an I/O processing request in a journal mode.

FIG. 7 is a flowchart showing a processing procedure used when the storage system 2 in the journal mode receives a read-write I/O processing request from the host 1.

Having received a read or write I/O processing request from the host 1, the storage controller 11 (step 701) determines whether or not the received processing request is a write I/O processing request (step 702). If the request is other than a write I/O processing request, the storage controller 11 reads, using the device management information 410, read data as an object of the read I/O processing request from an associated physical storage 10 or the cache memory 14 and then transfers the read data via the I/O interface 16 to the host 1 (step 709).

If it is determined in step 702 that the request is a write I/O processing request, the storage controller 11 refers to the device management information 410 to determine whether or not the logical storage 408 specified by the write I/O processing request is a main logical storage in the journal mode (step 703). If the logical storage 408 is other than a main logical storage in the journal mode, the storage controller 11 reserves an area in the cache memory 14 to store write data associated with the write I/O processing request (step 707). The storage controller 11 then stores the write data in the area reserved in the cache memory 14 and notifies termination of the write I/O processing to the host 1 (step 708).

The storage controller 11 may report the termination of the write I/O processing to the host 1 after the data of the cache memory 14 is stored in the physical storage 10 or may store the write data directly in the physical storage 10 without using the cache memory 14.

On the other hand, if it is determined in step 703 that the logical storage 408 as an object of the write I/O processing is a main logical storage in the journal mode, the storage controller 11 reserves an area in the cache memory 14 to store the write data and then stored the write data sent from the host 1 in the area.

Unlike the write operation to write the write data in an ordinary logical storage 408, successive write operations of a plurality of write data items are executed using one address specified for the write operations such that the storage controller 11 stores the respective write data items in different areas of the cache memory 14 for the following reasons. Assume that write objective data as an object of the write I/O processing request exists in the cache memory 14, but write data thereof is not reflected in the physical storage 10. In this situation, if the write objective data existing in the cache memory 14 is updated as in an ordinary write operation, the write objective data before the update is lost and hence cannot be stored in the journal logical storage (step 705). Thereafter, the storage controller 11 executes journal data creation processing and terminates the processing (step 706).

Figure 8:
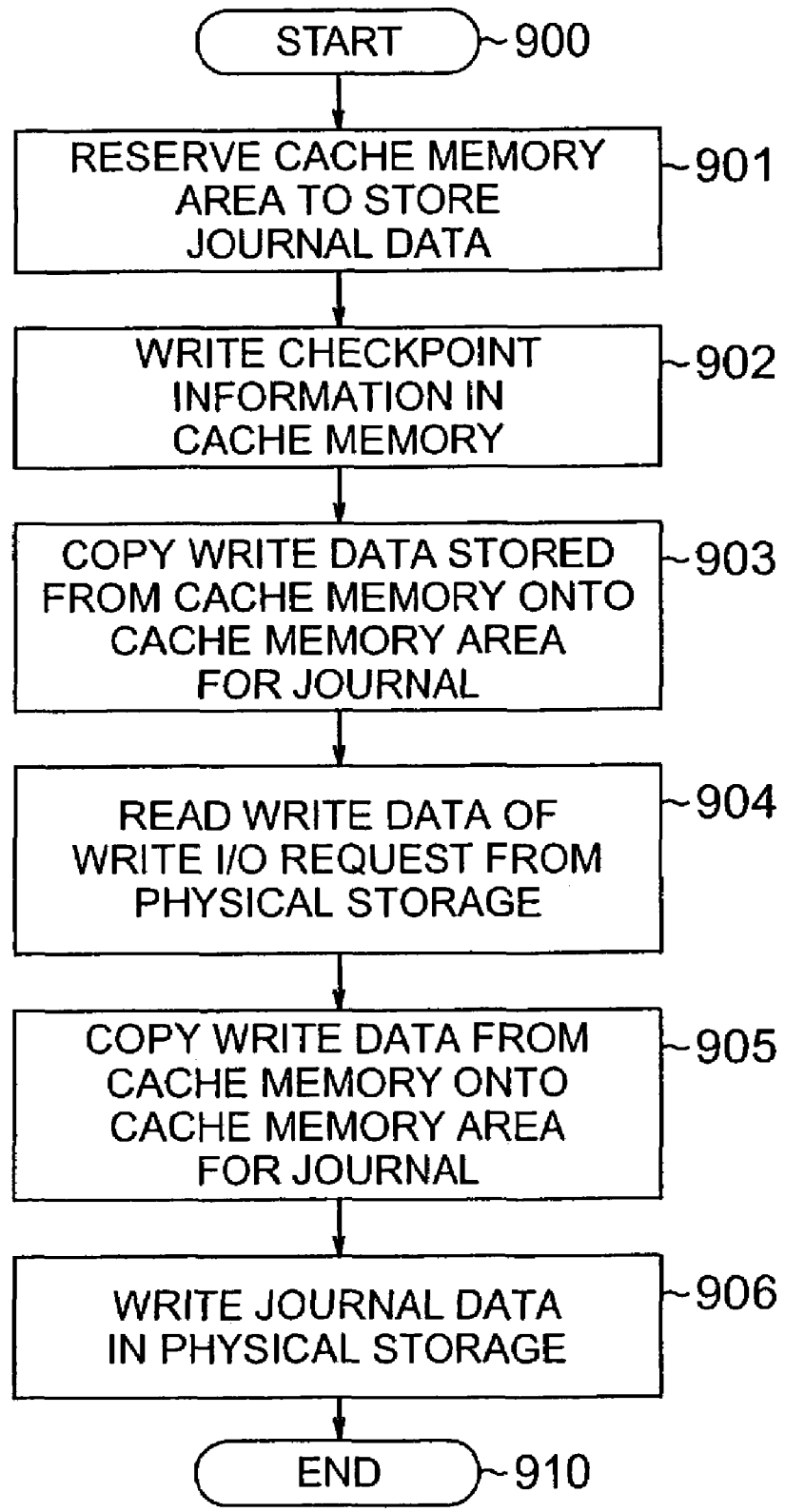
FIG. 8 is a flowchart showing a processing procedure example of journal data creation processing.

FIG. 8 is a flowchart showing a procedure of journal data creation processing in step 706 of FIG. 7. After having stored the write data in the cache memory 14, the storage controller 11 reserves an area in the cache memory 14 to temporarily store journal data (step 901).

The storage controller 11 copies the write data from the cache memory 14 onto the area reserved as a journal data storage area in the cache memory 14 together with checkpoint information, a processing sequence number, and a processing time (steps 902 and 903). However, an entry of CPID 1007 in the checkpoint information stores a checkpoint identifier only when a checkpoint command is received from the host 1. In other cases, the entry of CPID 1007 stores invalid data. The processing sequence number is a processing sequence number assigned by the processor 12 for each execution of processing.

Simultaneously, the storage controller 11 reserves an area in the cache memory 14 to store write objective data to be updated or replaced by the write data stored in the cache memory 14. The controller 11 reads the write objective data from the physical storage 10 or the cache memory 14 and stores the write objective data in the storage area reserved in the cache memory 14 (steps 904 and 905). As a result, the storage controller 11 creates journal data including the write data, the write objective data, the checkpoint information, the processing sequence number, and the processing time.

After the processing is completely terminated, the storage controller 11 returns to the processing of FIG. 7. The journal data created in the cache memory 14 is moved from the cache memory 14 to the physical storage 10 in an asynchronous way with respect to the creation of the journal data in the cache memory 14 (step 906).

FIG. 9 shows a data format of journal data.

As described in conjunction with FIG. 6, after the journal acquisition start indication is received, journal data is created in the cache memory 14 each time the storage system 2 processes a write I/O processing request for a main logical storage. The journal data is then stored in the physical storage 10. The journal data includes an entry 1001 to store checkpoint information uniquely identifying a system state in the host 1 and the storage system 2, an entry 1002 to store a block address indicating a location to update data, an entry 1003 to store length of write data to update data, an entry 1004 to store write objective data stored in the location to update data, and an entry 1005 to store the write data. The checkpoint information entry 1001 includes a checkpoint flag entry 1006, an entry 1007 to store checkpoint identifier (CPID), a processing sequence number entry 1008, and a time entry 1009.

When the storage system 2 receives a checkpoint command and checkpoint information from the host 1, the storage system 2 registers information indicating "on" to the checkpoint flag entry 1006 and stores a checkpoint identifier sent from the host 1 in the CPID entry 1007 of the checkpoint information entry 1001 of journal data created at reception of the checkpoint command. The checkpoint identifier stored in the CPID entry 1007 has a unique value corresponding to a particular CPID in the checkpoint information recorded in a log file controlled by the host 1. Therefore, when the host 1 specifies a checkpoint identifier, it is possible to designate a checkpoint identifier stored in the journal data corresponding to the specified checkpoint identifier.

Figure 10:
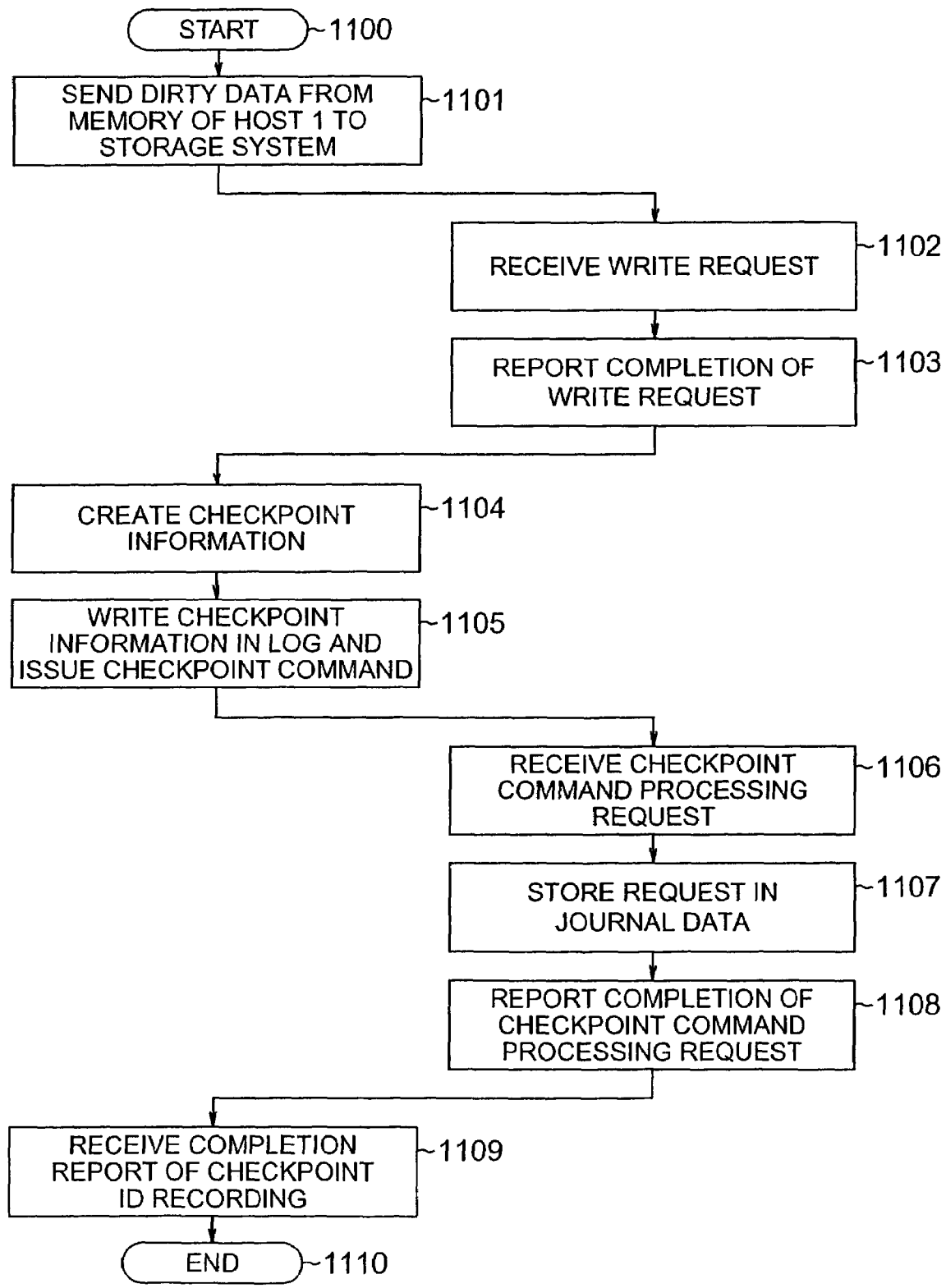
FIG. 10 is a flowchart showing a procedure example of checkpoint (CP) information transmission processing.

FIG. 10 shows, in a flowchart, a processing procedure for the host 1 to send checkpoint information to the storage system 2. By issuing a checkpoint command and by transmitting checkpoint information to the storage system 2, the host 1 can notify to the storage system 2 an event that the storage system 2 has determined a state of data in the database and has recorded a checkpoint in the log file (information items such as a checkpoint identifier are recorded).

First, the host 1 sends a write I/O processing request to the storage system 2 to forcibly write in the storage system 2 data stored in the buffers of the memory 21 such as the database buffer 509 and the log buffer 510. As a result of the processing, the host 1 can determine data of the database by reflecting in the storage system 2 data (dirty data) which is stored only in the buffers and which is not stored in the storage system 2 (step 1101).

Having received the write I/O processing request, the storage controller 11 writes data sent from the host 1 in the cache memory 14 (step 1102). After the data thus transferred is entirely written in the cache memory 14, the storage controller 11 notifies termination of the write I/O processing to the host 1. In this operation, the storage controller 11 also creates journal data corresponding to these data items (step 1103).

The host 1 having received the notification of termination of the write I/O processing does not write data in the storage system 2 until the storage system 2 reports termination of CPID write processing executed in subsequent steps. However, the host 1 may execute a data read operation.

After the termination of the write I/O processing is notified, the host 1 executes processing of the transaction manager 502 to create checkpoint information and a log to be used in checkpoint processing. Specifically, the checkpoint information such as a checkpoint identifier is stored as a log in the log file 506. The checkpoint information includes a checkpoint identifier, the number of resource managers, states of the resource managers, the number of transactions in operation, and description f each transaction. Details of the resource managers will not be described (steps 1104 and 1105). At the same time, the host 1 issues a checkpoint command to the storage system 2. The command includes a checkpoint identifier (step 1105).

Having received the checkpoint command from the host 1 (step 1106), the storage system 2 stores the received checkpoint identifier as journal data in the journal logical storage. In this case, write objective data and write data are absent respectively for the entries 1004 and 1005 of the journal data. Therefore, data items are not stored in these entries or invalid data items (each including, for example, −1) are stored therein (step 1107). When the recording is completed, the storage controller 11 notifies completion of the recording operation to the host 1 (step 1108).

When the report of completion of CPID recording operation is received from the storage system 2, the host 1 terminates the processing for the checkpoint information (step 1109).

Figure 11:
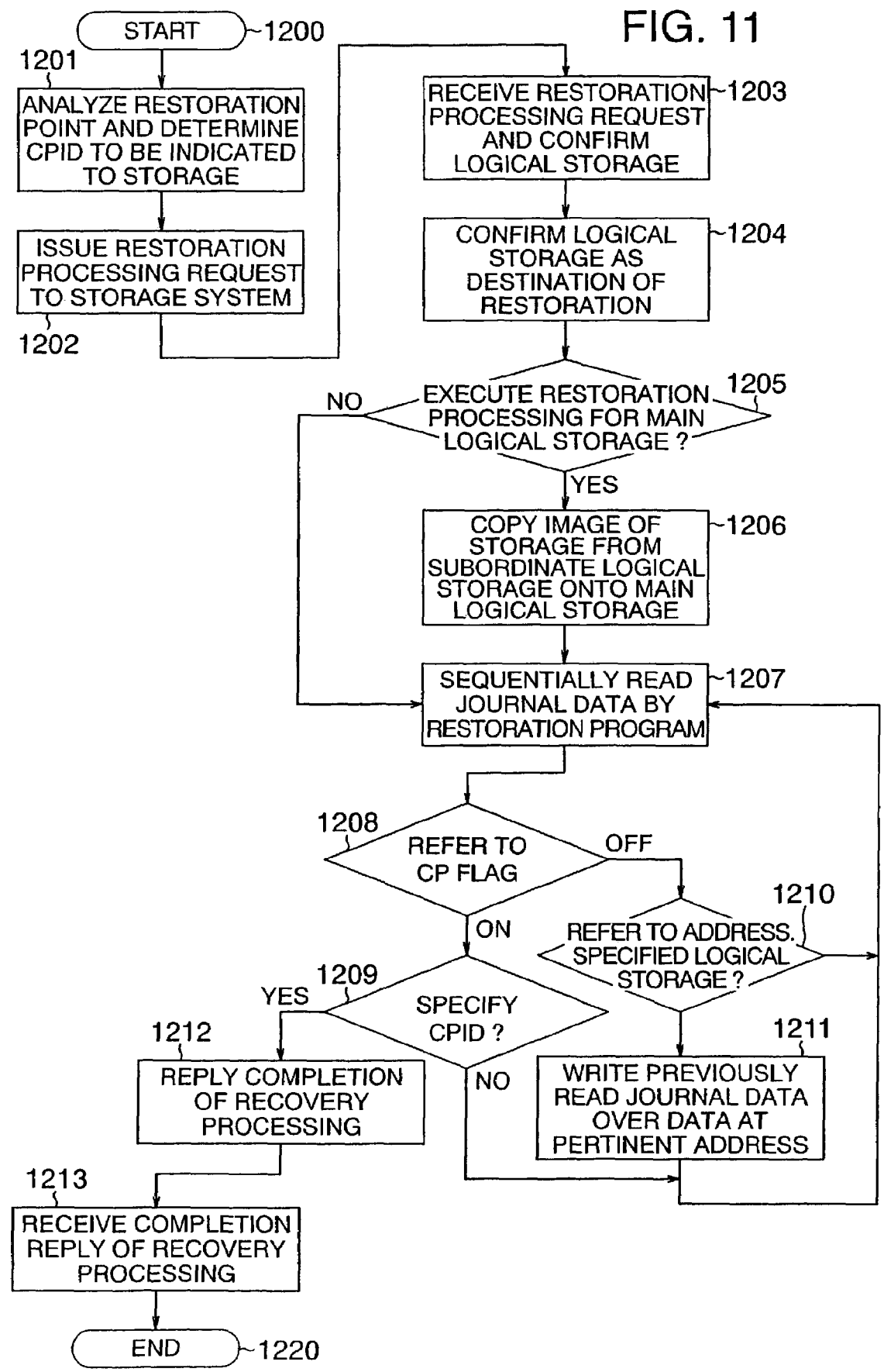
FIG. 11 is a flowchart showing a procedure example of restoration processing.

FIG. 11 shows in a flowchart a processing procedure for the storage system 2 having received a restoration indication from the management terminal 3 or the host 1. The storage system 2 conducts the processing by executing the restoration program 421 as follows.

In the embodiment, it is assumed that a failure such as a logical inconsistency, viewed from the host 1, occurs in the logical storage 408 due to a bug of the application program 540 using the database or an operation error by a user and the logical storage 408 in which the failure takes place is a main logical storage in the journal mode. In this situation, the management terminal 3 or the host 1 sends an indication to restore in the storage system 2 data stored in the main logical storage by using data stored in the subordinate logical storage and the journal logical storage corresponding to the main logical storage in which the failure has occurred.

The host 1 refers to, for example, log information of the application program 540 to analyze a failure point of time of an operation error or an erroneous operation of, for example, an application program having sent wrong data. The host 1 then retrieves a checkpoint command transmission time immediately before the failure point of time to determine a checkpoint identifier to be used by the storage system 2 to restore the data. The user of the host 1 can select, not the checkpoint identifier immediately before occurrence of the failure, one of checkpoint identifiers recorded in the host 1 when the host 1 sends the checkpoint information to the storage system 2. Therefore, by selecting a desired checkpoint identifier, the user of the system can restore data stored in the main logical storage to a state of data stored in the main logical storage of the storage system when the selected checkpoint identifier is created (step 1201).

Next, the host 1 issues to the storage system 2 a restoration processing request for data up to the checkpoint identifier selected in step 1201. The request includes an identifier (e.g., WWN and LUN) of the main logical storage as an object of the restoration processing, an identifier specifying the subordinate logical storage corresponding to the main logical storage, an identifier specifying the journal logical storage, and information of the selected checkpoint identifier. When a plurality of subordinate logical storages correspond to the main logical storage, the restoration processing request also includes information specifying one of the subordinate logical storages (step 1202).

Having received the restoration processing request from the host 1, the storage controller 11 executes the restoration program 421 to comparatively refer to an identifier contained in the request to indicate the subordinate logical storage and the pair management information 412. The controller 11 thereby confirms whether or not the specified subordinate logical storage is an appropriate subordinate logical storage for the main logical storage. Similarly, the storage controller 11 comparatively refers to an identifier contained in the request to indicate the journal logical storage and the journal management information and thereby confirms whether or not the specified journal logical storage is an appropriate journal logical storage for the main logical storage (step 1203).

According to the contents of the restoration processing request, the storage controller 11 confirms whether the restoration processing is executed for the main logical storage, the subordinate logical storage, or a different available logical storage 408. Even when the main logical storage is specified as an object of the restoration processing, if the main logical storage is unavailable, the storage controller 11 notifies to the host 1 that the processing cannot be continuously executed because of a failure in the logical storage and then stops the processing. Similarly, even when it is indicated to restore data in the subordinate or another logical storage, if a failure exists in the specified logical storage, the storage controller 11 notifies to the host that the processing cannot be continuously executed because of the failure and then stops the processing (step 1204).

When the restoration processing is executed for the main logical storage or an available logical storage 408, the storage controller. 11 sequentially reads snapshot data from the subordinate logical storage, beginning at a first point thereof. The controller 11 copies the data onto the main logical storage to equalize a disk image of the main logical storage to that of the subordinate logical storage. When the restoration processing is executed for the subordinate logical storage, the copy processing is not required (step 1206).

When the copy processing from the subordinate logical storage is finished or when the data is restored in the subordinate logical storage, the storage controller 11 reserves a data storage area in the cache memory 14. The storage controller 11 sequentially reads journal data from the journal logical storage corresponding to the main logical storage beginning at a start point thereof in an order of the processing sequence number and moves the journal data to the area reserved in the cache memory 14. The first point to read journal data from the journal logical storage may be specified by the host 1 or may be specified by a processing sequence number from the storage system 2 (step 1207).

In the operation, the storage controller 11 confirms whether or not the journal data thus obtained includes checkpoint information. Specifically, the storage controller 11 confirms whether or not the checkpoint flag 1006 is on in the journal data (step 1208).

If the readout journal data contains checkpoint information, the storage controller 11 further confirms whether or not a checkpoint identifier contained in the checkpoint identifier entry 1007 of the readout journal data is a checkpoint identifier specified by the host 1 (step 1209).

If the checkpoint identifier contained in the checkpoint identifier entry 1007 is other than that specified by the host 1 or if the checkpoint identifier entry 1007 does not contain a checkpoint identifier (the checkpoint flag is not on), the storage controller 11 checks information stored at address of the readout journal data to confirm whether or not the journal data is journal data regarding the main logical storage as an object of the specified restoration (step 1210).

If the journal data is journal data regarding the main logical storage as an object of the specified restoration, the storage controller 11 writes write data contained in the obtained journal data in the main or subordinate logical storage beginning at an associated address. However, if the journal data corresponds to a checkpoint identifier, there does not exist write data, and hence the storage controller 11 does not conduct any data write operation (step 1211).

Thereafter, the storage controller 11 returns control to step 1207 to execute processing to read next journal data. If the journal data obtained in step 1210 is other than journal data corresponding to the specified main logical storage, the storage controller 11 returns to the processing in step 1207 without writing the journal data in the logical storage 408 as the destination of the restoration. Next, the storage controller 11 repeatedly executes processing in steps 1207 to 1211 to restore journal data up to a state thereof according to the specified checkpoint identifier.

In step 1209, if the checkpoint identifier in the checkpoint identifier entry 1007 is equal to the specified checkpoint identifier, the storage controller 11 assumes that the data to be restored has entirely written in the main, subordinate, or another logical storage 408 and then notifies completion of the restoration processing to the host 1. If the restoration processing is executed for other than the main logical storage, the storage controller 11 writes and changes logical-physical mapping information before the notification to the host 1 to replace the main, subordinate, or another logical storage 408 as the destination of the restoration. Thanks to this operation, the identifier (e.g., a combination of WWN of fiber channel (FC) and a logical unit (LU) number) for the host 1 to access the logical storage 408 is kept unchanged (step 1212).

If a journal logical storage is allocated for each main logical storage, the processing in step 1210, namely, the confirmation of the correspondence between the readout journal data and the main logical storage is not required.

When the completion report is received from the storage system 2, the host 1 or the management terminal 3 assumes that the data is restored up to the point of the checkpoint identifier specified by the host 1 and continues other processing (1213).

FIG. 12 shows an example of the device management information 410.

The information 410 includes a table 1300 including an entry to register address information of the logical storage 408 and an entry 1304 to register address information of the physical storage 10; a table 1330 including an entry 1331 to register a logical storage number supplied to the host 1, an entry 1332 to register an intra-storage logical storage number uniquely identify the logical storage 408 in the storage system 2, an entry 1333 to register a parity group sequential number for control in the storage system 2, an entry to register pair information of the logical storage 408, and an entry 1335 to register journal information; and a table 1350 including an entry 1351 to register a logical storage number in the storage system 2, an entry 1352 to register available/reserved information, an entry 1353 to register path definition information, an entry 1354 to register an emulation type/size, and an entry 1355 to register failure information.

The entry 1301 of the table 1300 further includes an entry 1311 to register a number assigned to a logical storage 408 supplied to the host 1, an entry 1312 to register an internal address corresponding to the logical storage 408, an entry 1313 to register a logical storage number to uniquely identify the logical storage in the storage system 2, and an entry 1314 to register an internal logical storage address in the storage system 2. The entry 1304 of the table 1300 further includes an entry 1321 to register a number assigned to the parity group 407 of a physical storage 10 corresponding to the logical storage registered to the entry 1301, an entry 1322 to register a number of the physical storage 10, and an entry 1323 to register address information of the physical storage 10.

The pair information entry 1334 of the table 1330 is used to register information indicating whether or not the logical storage is in the snapshot pair state. The journal objective mode entry 1335 is used to register information indicating whether or not the logical storage 408 is an object of journal acquisition, that is, an object of the journal mode.

The available/reserve information entry 1352 of the table 1350 is used to register information indicating whether or not the logical storage 408 is reserved to be used as a subordinate or journal logical storage. A logical storage 408 to which the reserve information is registered cannot be allocated to another use, for example, as a new logical storage for a job. The path definition information entry 1353 is used to register information whether or not the logical storage 408 is open to the outside and is to be supplied to the host 1. For example, if the I/O network is a fiber channel (FC), the entry 1353 is used to register information regarding a relationship between the logical storage 408 and a port of the fiber channel.

The emulation type entry 1354 is used to register information indicating a type of operating system which can recognize the storage device for which the logical storage 408 is emulated. For example, specifically, the entry 1354 is used to register information such as "open" indicating that the storage can be recognized by an operating system of open system type or "3990" indicating that the storage can be recognized by an operating system of main frame type.

The failure information entry 1355 is used to register information indicating whether or not the logical storage 408 is in failure. The failure mainly includes a physical failure of a physical storage 10 in which the logical storage 408 exists and a logical failure in which the manager intentionally closes the storage system 2.

FIG. 13 shows an example of a table of the pair management information 412.

The information 412 includes an entry 1401 to register a logical storage number to be supplied to the host 1, an entry 1402 to register a logical storage number in the storage system 2, an entry 1403 to register an emulation type/size, an entry 1404 to register a pair state, an entry 1405 to register generation information, and an entry 1406 to register pair management information.

The pair state entry 1404 is used to register information indicating a state of a pair such as a pair duplex state described above. The pair management information entry 1406 is used to register information indicating whether the logical storage 408 is a main logical storage or a subordinate logical storage. If the logical storage 408 is specified as a main logical storage, "0" is register to a main side entry 1411 and a value indicating a number assigned to a subordinate logical storage in the pair is registered to an associated subordinate side entry 1412. On the other hand, if the logical storage 408 is specified as a subordinate logical storage, "0" is register to the subordinate side entry 1411 and a value indicating a number assigned to a main logical storage in the pair is registered to the associated main side entry 1412.

If the logical storage 408 is specified neither as a subordinate logical storage nor as a main logical storage, "−1" indicating an insignificant value is registered to both of the main and subordinate side entries 1411 and 1412. If the logical storage 408 is at a central position of a cascade configuration of the snapshot pair 450, that is, the storage 408 is a subordinate logical storage in a first pair and a main logical storage in a second pair at the same time, information indicating a number assigned to another logical storage 408 paired with both thereof is registered to the main and subordinate side entries 1411 and 1412. Furthermore, a plurality of logical storage numbers are registered to the main and subordinate side entries 1411 and 1412 depending on cases.

FIG. 14 shows an example of the journal management information 418.

The information 418 includes a table 1500 and a journal management table 1520 to control checkpoint information. The table 1500 includes an entry 1501 to store a checkpoint identifier (CPID), an entry 1502 to register an address indicating a position to store journal data in which the checkpoint identifier stored in the entry 1501 is recorded, and a time information entry 1503 indicating a point of time at which the checkpoint identifier stored in the entry 1501 is recorded in the journal logical storage. The journal management table 1520 includes an entry 1521 to register a device number, an entry 1522 to register a checkpoint identifier, and an entry 1523 to register a storage address of a checkpoint management table.

Next, description will be given of a second embodiment in which data recovery is conducted when a failure occurs in the storage system 2. In this case, the checkpoint information is shared not between the host 1 and the storage system 2 but between the management terminal 3 and the storage system 2.

The embodiment uses a program for the host 1 to control a log and a checkpoint with respect to the storage system 2. For example, the host 1 uses a program called "agent" when the database management software (DBMS) 501 is not provided. The host using the agent will be referred to as a host 1' hereinbelow.

Figure 21:
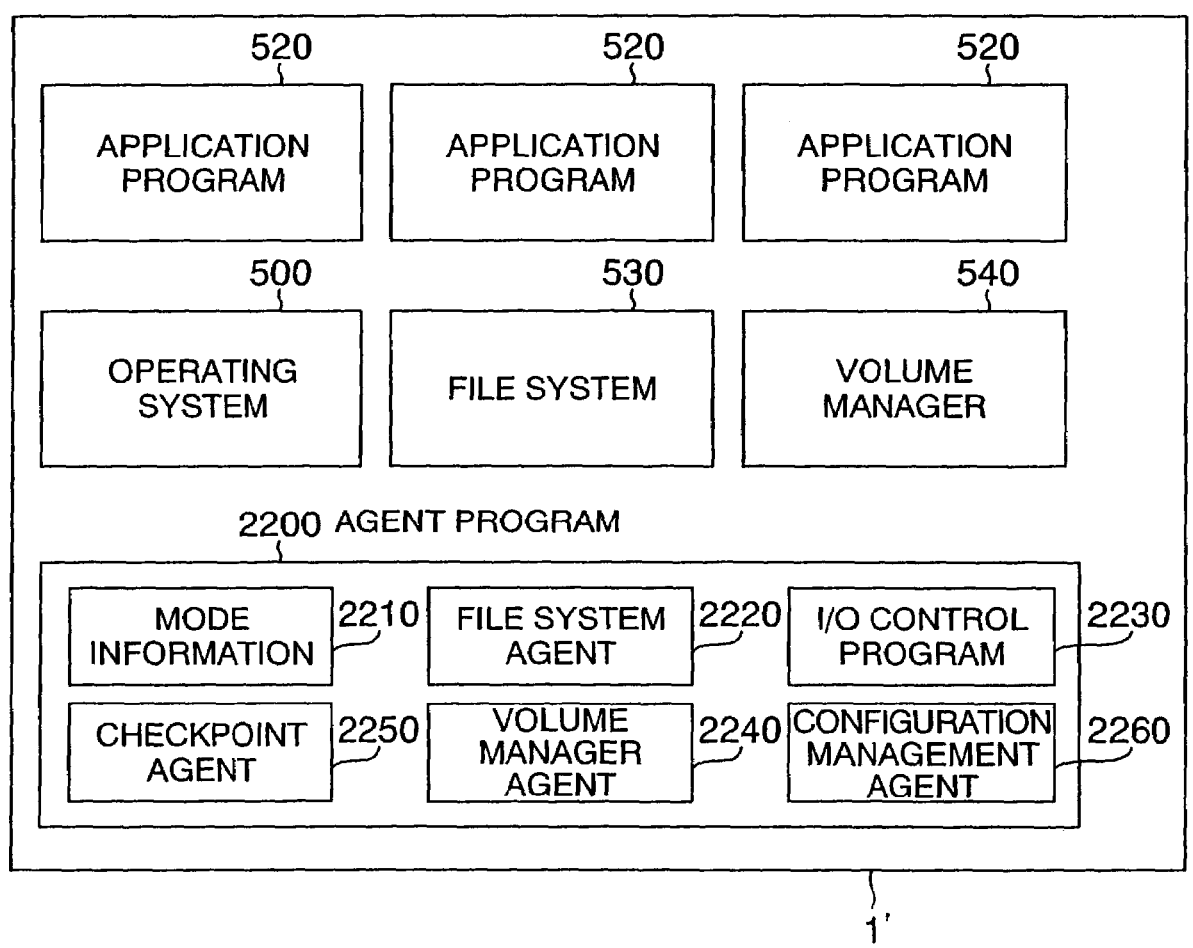
FIG. 21 is a flowchart showing a logical configuration example of a host 1' in the second embodiment.

FIG. 21 illustrates a configuration of programs of the host 1'. This differs from that of the host 1' in that the database management software (DBMS) 501 is not included and an agent program 2200 is included in place of the software 501. The agent program 2200 includes mode information 2210, a file system (FS) agent 2220, an I/O control program 2230, a checkpoint agent 2250, a volume manager (VM) agent 2240, and a configuration management agent 2260.

The mode information entry 2210 keeps mode information, that is, information received by the host 1' from the management terminal 3 such as a period of time to obtain a snapshot and a state during a period of time to obtain journal data. The FS agent 2220 is executed to indicate, to the file system (FS) 530, processing to exclusively control a file or to close a file. The FS agent 2220 is also executed to control dirty data controlled by the file system 530 as an address of the memory 21.

The volume manager (VM) agent 2240 is executed to control, for the volume manager 540, allowance or rejection of a read or write operation for a logical storage area set by the volume manager 540 and to control dirty data controlled by the volume manager 540 as an address of the memory 21.

The I/O control program 2230 is executed to conduct processing in which the host 1' forcibly transfers dirty data to the storage system 2. The configuration management agent 2260 is executed to control a correspondence between logical storages 408 supplied from the storage system 2 to the host 1' and logical storage areas configured by the volume manager 540 and a relationship between logical areas configured by the volume manager 540 and logical storage areas configured by the file system 530.

The checkpoint agent 2250 is executed, when the host 1' sets the mode information 2210 and indicates predetermined operations to the file system agent 2220, the volume manager agent 2240, and the I/O control program 2230 in response to an indication issued for a checkpoint from the management terminal 3.

The host 1' executes the file system agent 2220 according to an indication from the management terminal to send dirty data from the memory 21 of the host 1' to the storage system 2. On the other hand, in association with the transmission of dirty data from the host 1', the management terminal 3 sends a checkpoint command to the storage system 2. The storage system 2 processes the dirty data sent from the host 1'. The storage system 2 controls the checkpoint information sent from the management terminal 3 in the system 2 in almost the same way as for the checkpoint information sent from the host 1 described in conjunction with the first embodiment. As a result, even if the host 1 has not the function such as the checkpoint creation function when a logical failure occurs in a main logical storage, it is possible by indicating a checkpoint identifier from the management terminal 3 to restore data at a high speed up to a checkpoint controlled on the side of the storage system 2 to thereby restore the system at a high speed.

Figure 15:
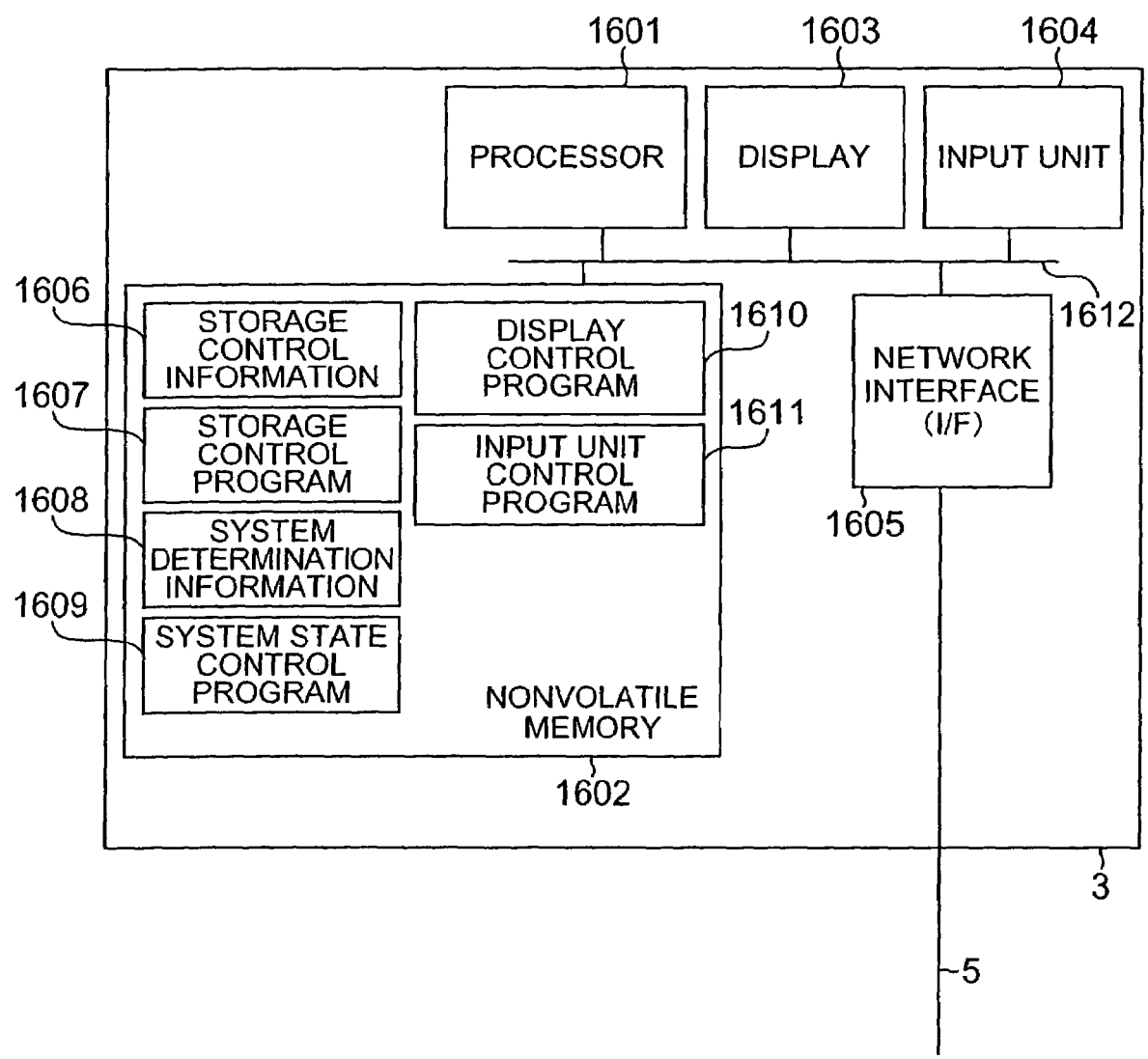
FIG. 15 is a diagram showing a configuration example of a management terminal 3.

FIG. 15 shows a detailed configuration of the management terminal 3. The configuration may be used in another embodiment.

The terminal 3 includes a processor 1601, an electrically nonvolatile memory 1602, a network interface (I/F) 1605, an input unit 1604, and a display 1603. The respective constituent components are connected to each other via a transmission path 1612 transmitting, for example, data and a control instruction.

The processor 1601 executes a program of the management terminal 3. The memory 1602 stores, for example, programs to be executed by the processor 1601 and information used by the programs. For example, the memory 1602 stores a display control program 1610, an input unit control program 1611, storage control information to control a configuration of the storage system 2, a storage control program 1607 to control or to manage the storage system 2 using information registered to the storage control information 1606, system determination information containing checkpoint information sent to the storage system 2, and a system state control program 1609 to conduct control and processing, for example, to restore a state of the storage system 2 to a state of a predetermined point of time using information registered to the system determination information 1608.

The network interface 1605 is connected to the network 5. The management terminal 3.obtains via the network 5 a system configuration of the storage system 2, for example, the device management information 410, the pair management information 412, and the journal management information 418. The management terminal 3 executes, via the network 5, configuration definition processing (for example, defines logical storages 408 in a parity group 407 to allocate logical storage numbers in the storage system 2 and/or defines paths for the host 1' to use logical storages 408 to allocate logical storage numbers to be used by the host 1'). The terminal 3 also controls execution of restoration processing of the storage system 2.

The user or manager of the storage system 2 uses the input unit 1604 and the display 1603, for example, to indicate maintenance/control and/or restoration processing of the storage system 2.

FIG. 16 shows an example of the system determination information 1608 stored in the memory 1602. To indicate a point of time when the state of the host 1' is determined to the storage system 2, the management terminal 3 records the contents indicated from the management terminal 3 to the storage system 2. The contents are recorded as system determination information 1608 in the memory 1602. The system determination information 1608 includes an entry 1701 to register a checkpoint identifier when the system state is determined, an entry 1702 to register a number indicating a logical storage, and an entry 1703 to register a point of time when the system state is determined.

Figure 17:
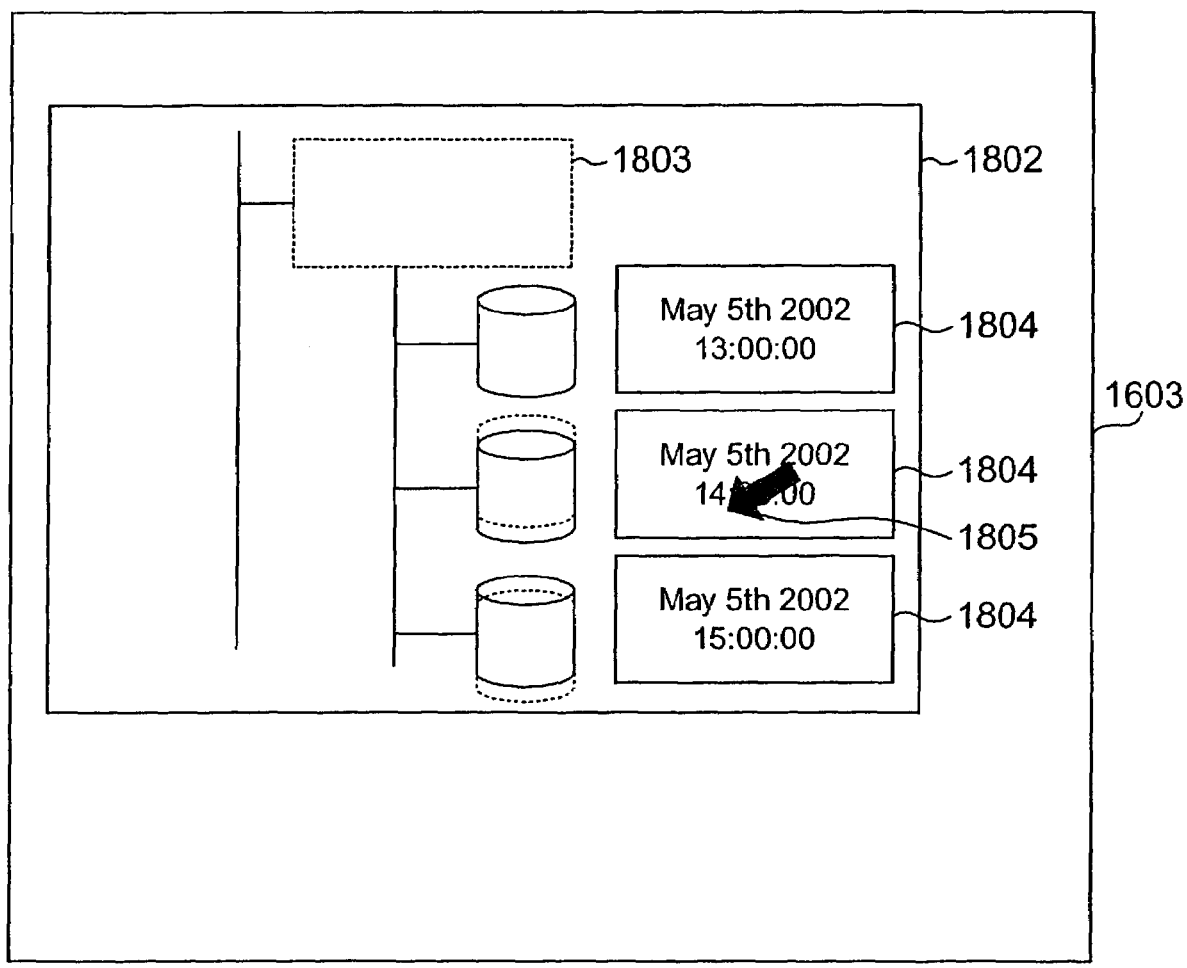
FIG. 17 is a diagram showing a configuration example of a display of the management terminal.

FIG. 17 shows an example of a display image on the display 1603. In the image, the contents of the system determination information 1608 are presented on the display 1603 using "graphic user interface (GUI)". In this way, the display 1603 can display a plurality of points of time when the system state is determined and an event that the user selects one of the points of time thus displayed. This improves operability for the user.

Specifically, the display 1603 includes an area 1802 to display control information. The area 1802 includes an area 1803 to display a logical storage number and an area 1804 to display a point of time when the state of the logical storage 408 displayed in the area 1803 is determined. Using a pointer 1805 which can be operated, for example, by a mouse, the user can specify the time when the state of the displayed logical storage 408 is determined by a checkpoint command.

At occurrence of a failure in a logical storage 408, the user can indicate restoration processing via the graphic user interface 1603 of the management terminal 3 to the storage system 2. For example, the diagram illustrates an indication to restore the contents of the logical storage 408 displayed in the area 1803 to the state at the point of time "14:00 on May 5, 2002" selected from the points of time displayed in the area 1804. Using the pointer 1805, the user selects the area 1804 indicating "May 5, 2002 14:00" and then drags and drops the selected contents to the area 1803 to thereby indicate a restoration point of time of the logical storage 408.

According to the logical storage 408 and the restoration time specified by the user, the management terminal 3 retrieves the system determination information 1608 shown in FIG. 16 to determine a checkpoint to be used for the restoration. Thereafter, using a restoration command, the management terminal 3 sends checkpoint information resultant from the retrieval to the storage system 2.

Figure 18:
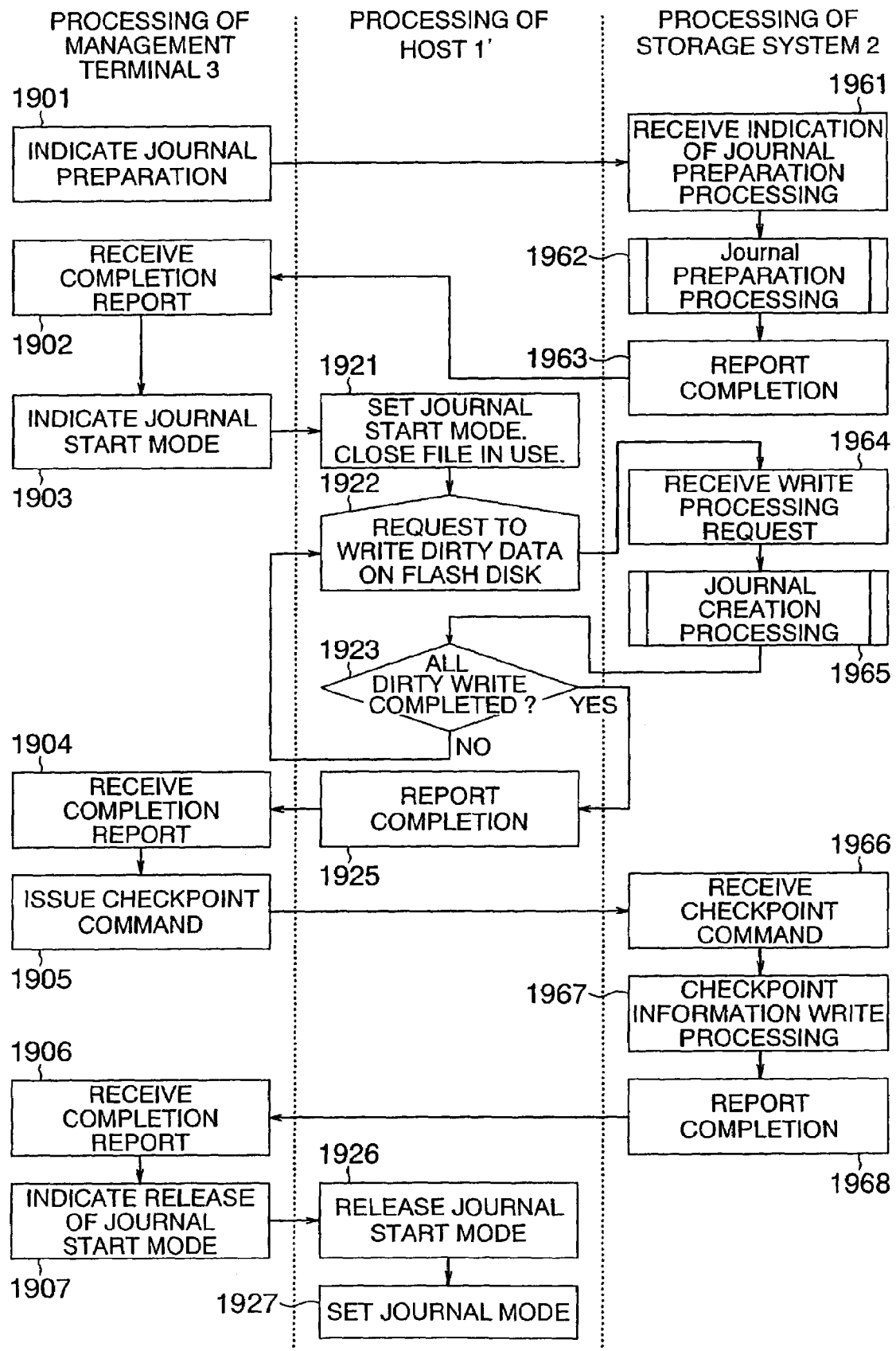
FIG. 18 is a flowchart showing a processing procedure example for a journal data acquisition indication in a second embodiment.

FIG. 18 shows in a flowchart a flow of processing in which the user indicates journal data start preparation processing via the management terminal 3 to the information processing system.

First, using the display 1603 and the input unit 1604 of the management terminal 3, the user specifies a main logical storage and a subordinate logical storage as objects to acquire journal data. According to specifications from the user, the management terminal 3 sends a journal acquisition indication command via the network 5 to the storage system 2. The journal acquisition indication command includes an identifier indicating a main logical storage specified by the user, an identifier indicating a subordinate logical storage paired with the main logical storage, and an identifier indicating a journal logical storage (step 1901).

Having received the journal preparation processing indication (step 1961), the storage system 2 executes journal preparation processing. The processing is almost the same as the processing described in conjunction with steps 602 to 606 of FIG. 6 (step 1962). After the journal preparation processing is finished, the storage system 2 sends a completion report via the network 5 to the management terminal 3 (step 1963).

Having received the termination report (step 1902), the management terminal 3 sends a journal start mode indication command via the network 5 to the host 1' (step 1903).

Having received the journal start mode indication command, the host 1' executes an agent 800 to set mode information 810 corresponding to the main logical storage as an object of journal data acquisition to the journal start mode. To determine dirty data to be stored in the main logical storage set to the journal start mode, the host 1' closes the associated file. Incidentally, in the journal start mode, it is inhibited to write data in storage areas associated with the main logical storage set to the journal start mode (step 1921).

Next, to send entire dirty data stored in the memory 21 controlled by the file system to the storage system 2, the host 1' issues a write I/O processing request to the storage system (step 1922).

Having received the write I/O processing request from the host 1', the storage system 2 executes journal creation processing if the request indicates write processing for the main logical storage specified by the user. After the processing is terminated, the storage system 2 reports completion of the processing to the host 1' (step 1965).

Having received the completion of the processing, the host 1' determines whether or not dirty data controlled by the file system are entirely written in the storage system 2 (step 1923). If the entire dirty data has not been written, the host 1' repeatedly executes the processing beginning at step 1922. If the entire dirty data has been written, the host 1' sends a completion report via the network 5 to the management terminal 3 (step 1925).

Having received the completion report of dirty data write operation, the management terminal 3 issues a checkpoint command to the storage system 2 and updates the system determination information 1608. Specifically, the management terminal 3 records a checkpoint identifier transmitted therefrom and a transmission time to an entry corresponding to a device number specifying the logical storage 408 for which journal data is to be obtained (step 1905).

Having received the checkpoint command (step 1966), the storage system 2 writes in the journal logical storage a checkpoint identifier in the received checkpoint command as journal data (step 1967). After the recording operation is completed, the storage system 2 sends a completion report via the network 5 to the management terminal 3 (step 1968).

Having received the completion report (1906), the management terminal 3 sends a journal start mode release indication via the network 5 to the host 1' (step 1907). Having received the indication, the host 1' releases the journal start mode set in step 1921 to the mode information 810 corresponding to the main logical storage. Thereafter, the host 1' releases the inhibition of the write operation in storage areas corresponding to the main logical storage (step 1927).

Thereafter, the user sends from the management terminal 3 a journal mode start indication to the host 1' and the storage system 2 at predetermined timing. Having received the indication, the host 1' sets the journal mode to mode information 810 corresponding to the main logical storage specified by the indication. On the other hand, the storage system having received the journal mode start indication, starts recording journal data in the journal logical file previously specified.

Figure 19:
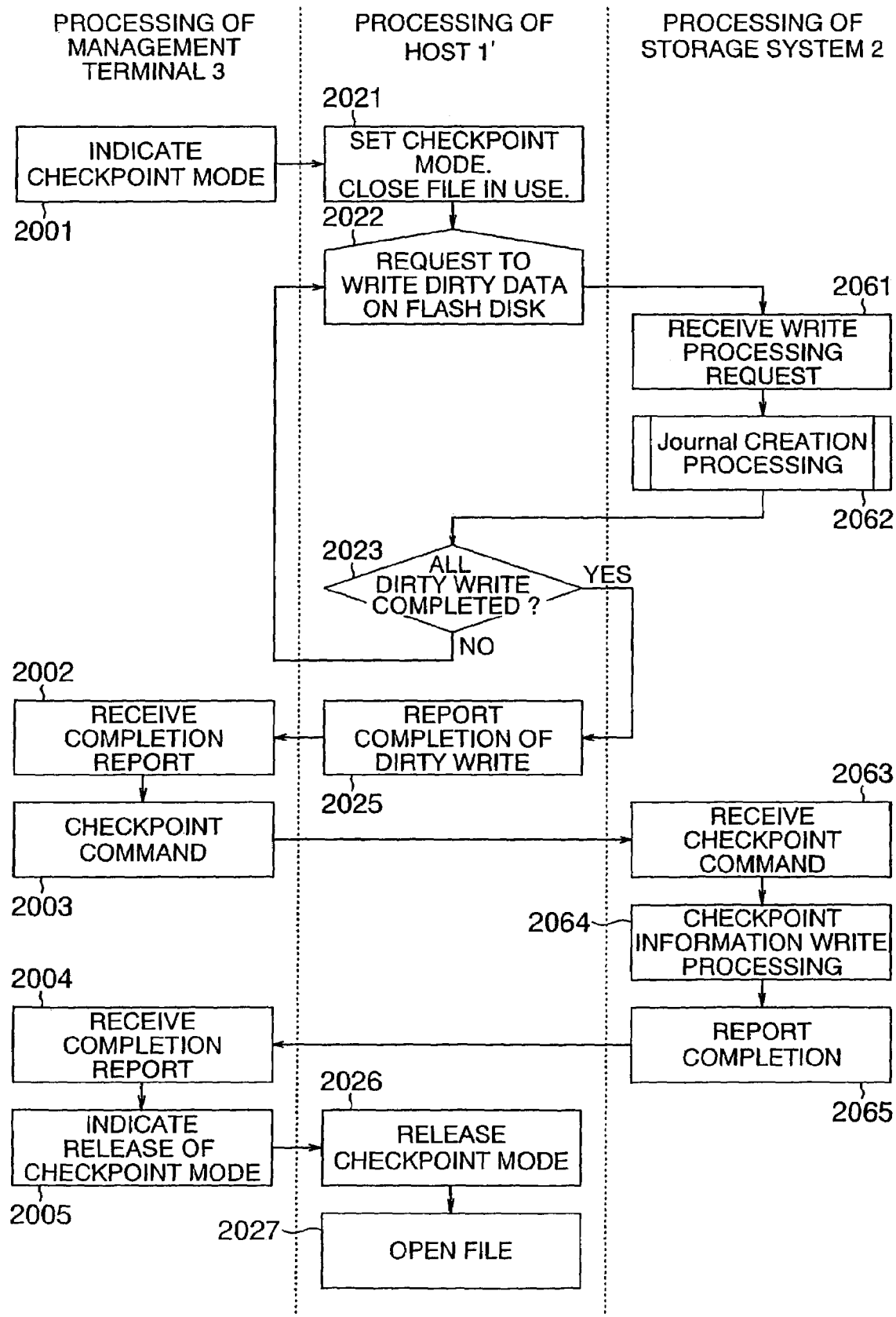
FIG. 19 is a flowchart showing a processing procedure example for checkpoint identifier (CPID) transmission/reception in the second embodiment.

FIG. 19 shows in a flowchart a processing procedure to restore later the contents of a main logical storage for which journal data is obtained. For this purpose, in place of the host 1', the management terminal 3 sends a checkpoint command to the storage system 2 according to, for example, an indication from the user such that a unique checkpoint identifier is stored in both of the storage system 2 and the management terminal 3.

According to a user indication or execution of a program of the management terminal 3, the management terminal 3 sends a checkpoint mode indication via the network 5 to the host 1'. The checkpoint mode indication includes a number indicating the logical storage 408 as an object of acquisition of a checkpoint (step 2001).

Having received the checkpoint indication, the host 1' executes the agent program 800, refers to the number of the logical storage 408 contained in the indication and information registered to the mode information 810, and confirms that the indicated logical storage 408 is in the journal mode. If this is the case, the host 1' forcibly transfers dirty data from the memory 21 to the storage system 2.

Specifically, the host 1' executes the configuration definition agent and the file system agent 2220 to confirm whether or not a file using the specified logical storage 408 is already in use. Thereafter, the host 1' executes the file system agent 2220 to close the file in use or to inhibit execution of a write request for the file in use. The host 1' then sends a write I/O processing request to the storage system 2 to request transfer of data stored in the memory 21. If the host 1' is using the volume manager, the host 1' executes the volume manager agent 2240 to execute processing almost in the same wary as described above (step 2022).

Having received the write I/O processing request, the storage system 2 executes, according to the flow of FIG. 7, processing to store journal data in the journal logical storage (steps 2061 and 2062).

After a completion report of journal creation is received, the host 1' confirms whether or not the dirty data has been entirely stored in the storage system 2. If the dirty data has not been entirely stored in the storage system 2, the host 1' repeatedly executes the processing beginning at step 2022 (step 2023).

When it is confirmed that the dirty data is entirely stored in the storage system 2, the host 1' sends to the management terminal 3 a report of dirty data write completion as a response message to the checkpoint mode indication (step 2025).

Having received the write completion report (step 2002), the management terminal 3 issues a checkpoint command to the storage system 2 and updates the system determination information 1608 to record a checkpoint identifier transmitted therefrom and a point of time of the transmission (step 2003).

Having received the checkpoint command (step 2063), the storage system 2 records journal data including the checkpoint identifier of the received checkpoint command (step 2064). Thereafter, the storage system 2 sends a completion report via the network 5 to the management terminal 3 (step 2065).

Having received the completion report, the management terminal 3 sends a checkpoint mode release indication via the network 5 to the host 1' (step 2004).

Having received the checkpoint mode release indication, the host 1' releases the checkpoint mode registered to the mode information 810 corresponding to the logical storage 408 set to the checkpoint mode in step 2021 (step 2026). Thereafter, the host 1' restarts the write operation for the file or sets the file to an available state (step 2027).

Figure 20:
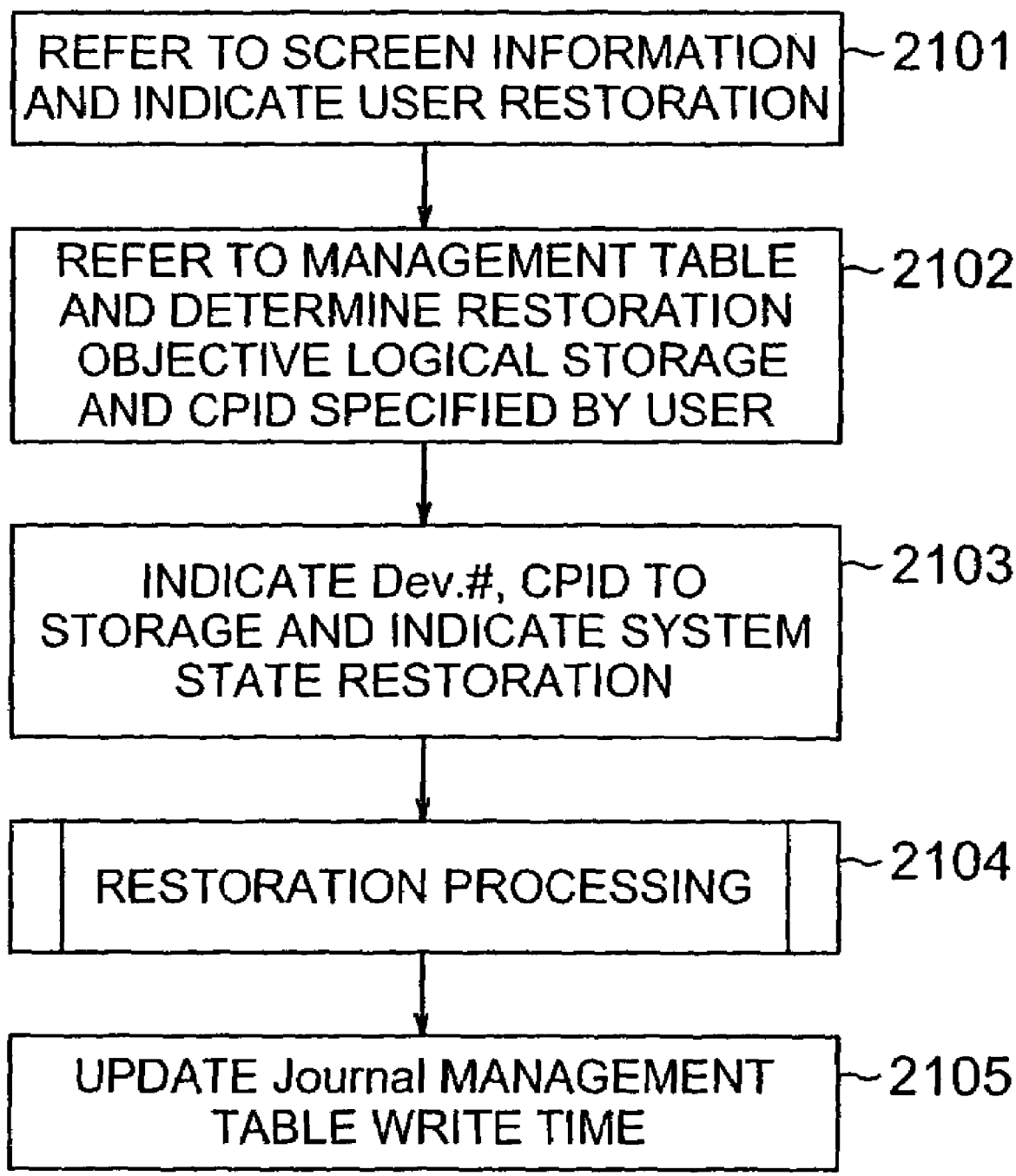
FIG. 20 is a flowchart showing a procedure example of restoration indication processing in the second embodiment.

FIG. 20 is a flowchart showing a processing procedure used when the user issues a restoration indication from the management terminal 3 to the storage system 2. In the embodiment, it is assumed that the snapshot pair 450 has already been created, a snapshot of the main logical storage has already been obtained in the subordinate logical storage, and the journal logical storage has already stored journal data after or before and after a point of time when the snapshot is obtained in the subordinate logical storage.

In this situation, assume that an application program of the host 1' using the main logical storage requires data restoration using backup data, for example, because the application program has erroneously edited a file in use.

First, using the input unit 1604 and the display 1603 of the management terminal 3, the user indicates a logical storage 408 as an object of restoration and a point of time for the restoration (step 2101).

Having received the indication from the user, the management terminal 3 determines which one of the entries of the system determination information 1608 includes registered information concordant with input information specified on the screen by the user. The terminal 3 resultantly determines a checkpoint identifier registered to the concordant entry (step 2102). The management terminal 3 then sends an identifier (a number) indicating a logical storage 408 for the restoration and a restoration command including the checkpoint identifier to the storage system 2 (step 2103).

Having received the restoration command from the management terminal 3, the storage system 2 executes, for the specified logical storage 408, the restoration processing explained in conjunction with FIG. 11. Thereafter, the storage system 2 sends a restoration processing completion report to the management terminal 3 (step 2104). Having received the completion report, the management terminal 3 updates the storage control information 1606 (step 2105).

According to the embodiment, when compared with the host 1 of the first embodiment, the host 1' does not control the checkpoint information and hence the load of the control operation can be reduced as much. For example, even if the host 1 does not have the checkpoint creation function, the restoration processing can be executed using the checkpoint information in the present invention.

In the embodiment, before issuing a checkpoint command to the storage system 2, the management terminal 3 sends, to reflect dirty data stored in the host 1' in the storage system 2, indications, i.e., a journal mode start indication and a checkpoint mode indication to the host 1' to flash the dirty data. However, in this case, the host 1' must prepare a program called "agent" as described above. Therefore, if it is difficult to prepare the agent in all hosts 1', the present embodiment is not easily adopted. To overcome this difficulty, there is considered a third embodiment. By ignoring the dirty data existing in the host 1', the journal mode is set, a checkpoint is communicated, and the restoration processing is executed only by the management terminal 3 and the storage system 2.

The embodiment differs from the second embodiment as follows. In FIG. 18, having received a completion report of journal creation preparation processing (step 1902), the management terminal 3 executes processing of step 1904 to send a checkpoint command directly to the storage system 2 without executing the processing of step 1903. According to the checkpoint command thus received, the storage system 2 executes processing beginning at step 1966.

In FIG. 19, the management terminal 3 directly sends a checkpoint command to the storage system 2 (step 2003) without executing step 2001, i.e., without sending checkpoint mode specification to the host 1'. Having received the checkpoint command, the storage system 2 executes processing beginning at step 2063.

The host used in the embodiment may be a computer having a database log such as the host 1, a computer having an agent such as the host 1', or an ordinary computer not having any particular program. The other configurations and processing such as the restoration processing are almost the same as those of the second embodiment.

According to the embodiment, regardless of the type of the host, any storage of the storage system 2 can be restored to a particular system state only by communicating data between the management terminal 3 and the storage system 2.

According to the present invention, in the restoration of data stored in a storage system, the data can be restored to a predetermined state in a short period of time without imposing any load on the host. Also, the user can restore the data to a particular system state.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information processing system comprising:
a computer; and
a storage system, coupled to the computer, which receives a write request from the computer;
wherein the storage system further comprises:
a control unit processing the write request from the computer;
a first storage, coupled to the control unit, which stores data related to the write request targeted to the first storage from the computer;
a second storage, coupled to the control unit, which stores a copy of data of the first storage at a first point in time; and
a third storage, coupled to the control unit, which records, write data related to the write request targeted to the first storage from the computer with time information and/or sequence numbers, and a plurality of checkpoints in time for recovery received from the computer, as journal data of the first storage, wherein the checkpoints uniquely identify a system state in the computer and the storage system;
wherein when the control unit receives a restoration request including a desired checkpoint information specifying one of the plurality of checkpoints, the information processing system generates an image of the first storage at a desired point in time specified with the desired checkpoint information based upon the copied data stored in the second storage, and journal data which are stored in the third storage and which are specified by the desired checkpoint and the first point in time.

2. An information processing system according to claim 1, wherein the first, second, and third storages are logical storages.

3. An information processing system according to claim 2, further comprising a second computer coupled to the storage system,
wherein the write request is sent from the second computer to the storage system.

4. An information processing system according to claim 1, wherein the computer comprises a storage and records the checkpoint information in the storage of the computer.

5. An information processing system according to claim 1, wherein the information processing system further comprises a management terminal including a display for displaying thereon information regarding the checkpoint information.

6. An information processing system according to claim 5, wherein the management terminal includes an input unit and transmits the checkpoint information specified by information inputted from the input unit to the storage system.

7. An information processing system according to claim 1, wherein at least some of the checkpoints are created by the computer when the computer receives a notification from the control unit indicating completion of a write request to write dirty data from the computer to the storage system.

8. A storage system coupled to a computer comprising:
a control unit processing a write request from the computer;
a first storage, coupled to the control unit, which stores data related to the write request targeted to the first storage from the computer;
a second storage, coupled to the control unit, which stores a copied data of the first storage; and
a third storage, coupled to the control unit, which records, write data related to the write request targeted to the first storage from the computer with time information and/or sequence numbers, and a plurality of checkpoints in time for recovery received from the computer, as journal data of the first storage, wherein the checkpoints uniquely identify a system state in the computer and the storage system;
wherein the control unit receives checkpoint information indicating timing information from the computer, and stores the checkpoint information in the storage system, and
wherein when the control unit receives a restoration request including a desired checkpoint information specifying one of the checkpoints, the control unit executes the restoration in response to the restoration request so that an image of the first storage at a desired point in time specified with the desired checkpoint information is created based upon the copied data stored in the second storage, and journal data which are stored in the third storage and which are specified by the desired checkpoint.

9. A storage system according to claim 8, wherein the first, second, and third storages are logical storages.

10. A storage system according to claim 9, further comprising a second computer coupled to the storage system,
wherein the write update request is sent from the second computer to the storage system.

11. A storage system according to claim 8, wherein at least some of the checkpoints are created by the computer when the computer receives a notification from the control unit indicating completion of a write request to write dirty data from the computer to the storage system.

12. A data restoration method in an information processing system comprising the steps of:
receiving a write request from a computer at a storage system;
storing data related to the write request targeted to a volume in the storage system;
storing write data of journal data related to the write request targeted to the volume from the computer in a storing area in the storage system;
generating a copy of the volume in the storage system;
recording data which contains time information and/or sequence numbers received from the computer, associated with the write request received at the storage system;
recording a plurality of checkpoints in time for recovery that are received from the computer, and which identify system states in the computer and the storage system, respectively;
managing a relationship between a plurality of checkpoints and the recorded data in a portion of the information processing system outside of the computer;
receiving a restore request specifying checkpoint information of one of the checkpoints; and
restoring, in the portion of the information processing system outside of the computer and in response to the restore request, an image of the volume based upon the copy of the volume in the storage system, and based upon the write data of the journal data associated with the recorded data specified by the checkpoint information.

13. A data restoration method according to claim 12, wherein the checkpoint information contains information corresponding to the recorded time information and/or sequence numbers.

14. A data restoration method according to claim 12, wherein the system state is one in which the computer and the storage system are consistent.

15. A data restoration method according to claim 12, wherein the restoring the image of the first storing area is performed in response to a restore request from a management computer.

16. A data restoration method according to claim 15, further comprising displaying information regarding the checkpoint information which is recorded in the computer.

17. A data restoration method according to claim 12, wherein at least some of the checkpoints are created by the computer when the computer receives a notification from the control unit indicating completion of a write request to write dirty data from the computer to the storage system.

18. A data restoration method in an information processing system comprising the steps of:
receiving a write request from a computer at a storage system;
storing data related to the write request targeted to a volume in the storage system;
storing write data of journal data related to the write request targeted to the volume from the computer in a storing area in the storage system;
generating a copy of the volume in the storage system;
recording data which contains time information and/or sequence numbers received from the computer, associated with the write request received at the storage system;
recording a plurality of checkpoints in time for recovery received from the computer;
managing a relationship between a plurality of checkpoints and the recorded data in a portion of the information processing system outside of the computer, at least some of the checkpoints are created by the computer to particularly identify points in time at which the data in the storage system matches the data in the computer;
receiving a restore request specifying checkpoint information of one of the checkpoints; and
restoring, in the portion of the information processing system outside of the computer and in response to the restore request, an image of the volume based upon the copy of the volume in the storage system, and the write data of the journal data associated with the recorded data which are specified by the checkpoint information.

19. A data restoration method according to claim 18, wherein the checkpoint information contains information corresponding to the recorded time information and/or sequence numbers.

20. A data restoration method according to claim 19, wherein the system state is one in which the computer and the storage system are consistent.

21. A data restoration method according to claim 18, wherein the restoring the image of the first storing area is performed in response to a restore request from a management computer.

22. A data restoration method according to claim 21, further comprising displaying information regarding the checkpoint information stored in the computer.

23. A data restoration method according to claim 18, wherein at least some of the checkpoints are created by the computer when the computer receives a notification from the control unit indicating completion of a write request to write dirty data from the computer to the storage system.

24. A data restoration method in an information processing system comprising the step of:
receiving a write request from a computer at a storage system;
storing data related to the write request targeted to a volume in the storage system;
storing write data of journal data related to the write request targeted to the volume from the computer in a storing area in the storage system;
generating a copy of the volume in the storage system at a first point in time;
recording data which contains time information and/or sequence numbers received from the computer, associated with the write request received at the storage system;
recording a plurality of checkpoints in time for recovery received from the computer;
managing a relationship between a plurality of checkpoints and the recorded data in the storage system, wherein the checkpoint indicates a system state in which the computer and the storage system are consistent;
receiving a restore request specifying checkpoint information of one of the checkpoints; and
restoring, in the storage system and in response to the restore request, an image of the volume based upon the copy of the volume in the storage system at the first point in time, and the write data of the journal data associated with the recorded data which are specified by the checkpoint information and the first point in time.

25. A data restoration method according to claim 24, wherein the checkpoint information contains information corresponding to the recorded time information and/or sequence numbers.

26. A data restoration method according to claim 24, wherein the restoring the image of the first storing area is performed in response to a restore request from a management computer.

27. A data restoration method according to claim 26, further comprising displaying information regarding the checkpoint information stored in the computer.

28. A data restoration method according to claim 24, wherein at least some of the checkpoints are created by the computer when the computer receives a notification from the control unit indicating completion of a write request to write dirty data from the computer to the storage system.

* * * * *